United States Patent
Hong et al.

(10) Patent No.: US 12,208,735 B2
(45) Date of Patent: Jan. 28, 2025

(54) REARVIEW MIRROR DEVICE

(71) Applicant: MOTHERSON INNOVATIONS COMPANY LIMITED, London (GB)

(72) Inventors: Won Sik Hong, Chungcheongbuk-do (KR); Ho Jin Huh, Chungcheongbuk-do (KR); Geon Young Choi, Chungcheongbuk-do (KR)

(73) Assignee: Motherson Innovations Company Limited, London (GB)

( * ) Notice: Subject to any disclaimer, the term of this patent is extended or adjusted under 35 U.S.C. 154(b) by 558 days.

(21) Appl. No.: 17/629,890

(22) PCT Filed: Jul. 23, 2020

(86) PCT No.: PCT/EP2020/070779
§ 371 (c)(1),
(2) Date: Jan. 25, 2022

(87) PCT Pub. No.: WO2021/018720
PCT Pub. Date: Feb. 4, 2021

(65) Prior Publication Data
US 2022/0250547 A1  Aug. 11, 2022

Related U.S. Application Data

(63) Continuation-in-part of application No. 16/524,984, filed on Jul. 29, 2019, now abandoned.

(51) Int. Cl.
*B60R 1/08* (2006.01)
*B60R 1/12* (2006.01)

(52) U.S. Cl.
CPC ............... *B60R 1/088* (2013.01); *B60R 1/12* (2013.01); *B60R 2001/1223* (2013.01)

(58) Field of Classification Search
None
See application file for complete search history.

(56) References Cited

U.S. PATENT DOCUMENTS

| | | |
|---|---|---|
| 2009/0243824 A1 | 10/2009 | Peterson et al. |
| 2018/0056871 A1 | 3/2018 | Karner et al. |
| 2018/0370440 A1 | 12/2018 | Larson et al. |

OTHER PUBLICATIONS

International Search Report dated Oct. 15, 2020 of International application No. PCT/EP2020/070779.
(Continued)

*Primary Examiner* — Bao-Luan Q Le
*Assistant Examiner* — Danell L Owens
(74) *Attorney, Agent, or Firm* — Jones Day

(57) ABSTRACT

The present disclosure refers to a rearview device, in particular a rearview mirror device for a motor vehicle, comprising: a rearview element including a first layer and a second layer; a housing supporting at least a portion of the rearview element; a light transmitting region formed to penetrate the second layer of the rearview element; a light emitter for emitting a first light including a first wavelength in a first direction through the light transmitting region; and a light receiver for detecting a second light entering a second direction through the light transmitting region, the second light entering the second direction including a second wavelength corresponding to the first wavelength, wherein a first function of the rearview device or an electrically operating configuration connected with the rearview device is executed when the second light including the second wavelength corresponding to the first wavelength is detected by the light receiver by a predetermined amount or more during a predetermined period, and wherein a transmittance of the first layer is larger than a transmittance of the second layer, or wherein a function of the rearview device or an electrically operating configuration connected with the rearview
(Continued)

device is executed when an object is located within a certain distance from light transmitting region, and wherein a transmittance of the first layer is larger than a transmittance of the second layer.

12 Claims, 21 Drawing Sheets

(56) References Cited

OTHER PUBLICATIONS

Written Opinion dated Oct. 15, 2020 of International application No. PCT/EP2020/070779.

REARVIEW MIRROR DEVICE

CROSS-REFERENCE TO RELATED APPLICATIONS

This application is a is a National Stage Entry of International Patent Application No. PCT/EP2020/070779, filed on Jul. 23, 2020, which claims the benefit of priority to U.S. application Ser. No. 16/524,984, filed on Jul. 29, 2019, each of which is hereby incorporated by reference in its entirety for all purposes.

BACKGROUND

1. Technical Field

The present disclosure relates generally to rearview devices for vehicles and, more particularly, to a rearview mirror device for a vehicle.

2. Discussion of Related Art

A rearview mirror device is a device that is mounted inside or outside a vehicle to provide a driver with a visual field of a region behind and/or at the sides of the vehicle.

Additionally, in order to provide useful information and various convenience functions to a driver and a passenger through a rearview mirror device, various components may be installed inside the rearview mirror device.

There is a need for a rearview mirror device that minimizes weight and volume and provides a driver with a wide visual field of a region behind and/or at the sides of the vehicle. Recently, a frameless-type rearview mirror device was developed. A frameless-type rearview mirror device is produced to have no bezel and thus provides enhanced aesthetic satisfaction to a driver, but it is difficult to install a user interface for controlling electronic parts included in or connected to the rearview mirror device. That is, there is no space to install a user interface that was conventionally installed on a bezel.

In order to solve this problem, there is a method of installing a user interface such as a touch panel on the front surface of a mirror. However, when the front surface of the mirror is implemented in the form of a touch panel, fingerprints may hinder the visual field of a driver, and the usability may be degraded.

SUMMARY

The present disclosure is directed to a rearview device capable of sensing a user input using an input applied to a mirror surface.

The present disclosure is also directed to a rearview device allowing a user to apply an input without direct contact with a mirror surface.

In one aspect, a rearview device includes a rearview element including a first layer and a second layer, a housing supporting at least a portion of the rearview element, a light transmitting region formed to penetrate the second layer of the rearview element, a light emitter for emitting a light including a first wavelength in a first direction through the light transmitting region, and a light receiver for detecting a light entering a second direction through the light transmitting region, the light entering the second direction including a second wavelength corresponding to the first wavelength. A first function of the rearview mirror device or an electrically operating configuration connected with the rearview mirror device is executed when the light including the second wavelength corresponding to the first wavelength is detected by the light receiver by a predetermined amount or more during a predetermined period. A transmittance of the first layer is larger than a transmittance of the second layer.

The light emitter and the light receiver may be comprised of one component.

The light emitter and the light receiver may be a photocoupler.

The first wavelength may be equal to the second wavelength.

A time at which the light including the second wavelength is detected by the light receiver by a predetermined amount or more during a predetermined period may be defined as a first time, a time at which the first function is executed may be defined as a second time, and the first time and the second time may be different from each other.

A second function may be executed when the light including the second wavelength is detected by the light receiver by the predetermined amount or more again after the first time.

A third function may be executed when the light including the second wavelength is detected by the light receiver by the predetermined amount or more during a first period and a fourth function may be executed when the light including the second wavelength is detected by the light receiver by the predetermined amount or more during a second period.

The light emitter may include a first light emitter and a second light emitter, the light receiver may include a first light receiver and a second light receiver, and the light transmitting region may include a first light transmitting region and a second light transmitting region. The first light emitter and the first light receiver may be comprised of a first photocoupler, and the second light emitter and the second light receiver may be comprised of a second photocoupler. The first photocoupler may be located at an area corresponding to the first light transmitting region and the second photocoupler may be located at an area corresponding to the second light transmitting region.

A fifth function may be executed when the light including the second wavelength is detected by the second light receiver by the predetermined amount or more after the light including the second wavelength is detected by the first light receiver by the predetermined amount or more.

A sixth function may be executed when the light including the second wavelength is detected by the first light receiver by the predetermined amount or more after the light including the second wavelength is detected by the second light receiver by the predetermined amount or more.

The fifth function may be different from the sixth function.

An indicator may indicate to a user that the first function is executed.

The indicator may be located adjacent to the light transmitting region.

A state of the indicator may be changed when the first function is executed.

An electrically operating configuration connected with the rearview mirror device may be at least one of an electrochromic element, a display, a speaker, a communication module and an Electronic Toll Collection System.

The first function of the electrochromic element may be at least one of turn on/off and changing reflectivity.

The first function of the display may be at least one of turn on/off, zoom in/out, dimming brightness up/down, pan/tilt, contrast up/down and aspheric view on/off.

The second layer may be a reflective layer.

In another aspect, a rearview mirror device includes a rearview element including a first layer and a second layer, a housing supporting at least a portion of the rearview element, a light transmitting region formed to penetrate the second layer of the rearview element, a light emitter emitting a light through the light transmitting region, and a light receiver detecting a light entering through the light transmitting region. A function of the rearview mirror device or an electrically operating configuration connected with the rearview mirror device is executed when an object is located within a certain distance from the light transmitting region. A transmittance of the first layer is larger than a transmittance of the second layer.

The function may be executed without contact between the rearview element and the object.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

Figure 1:
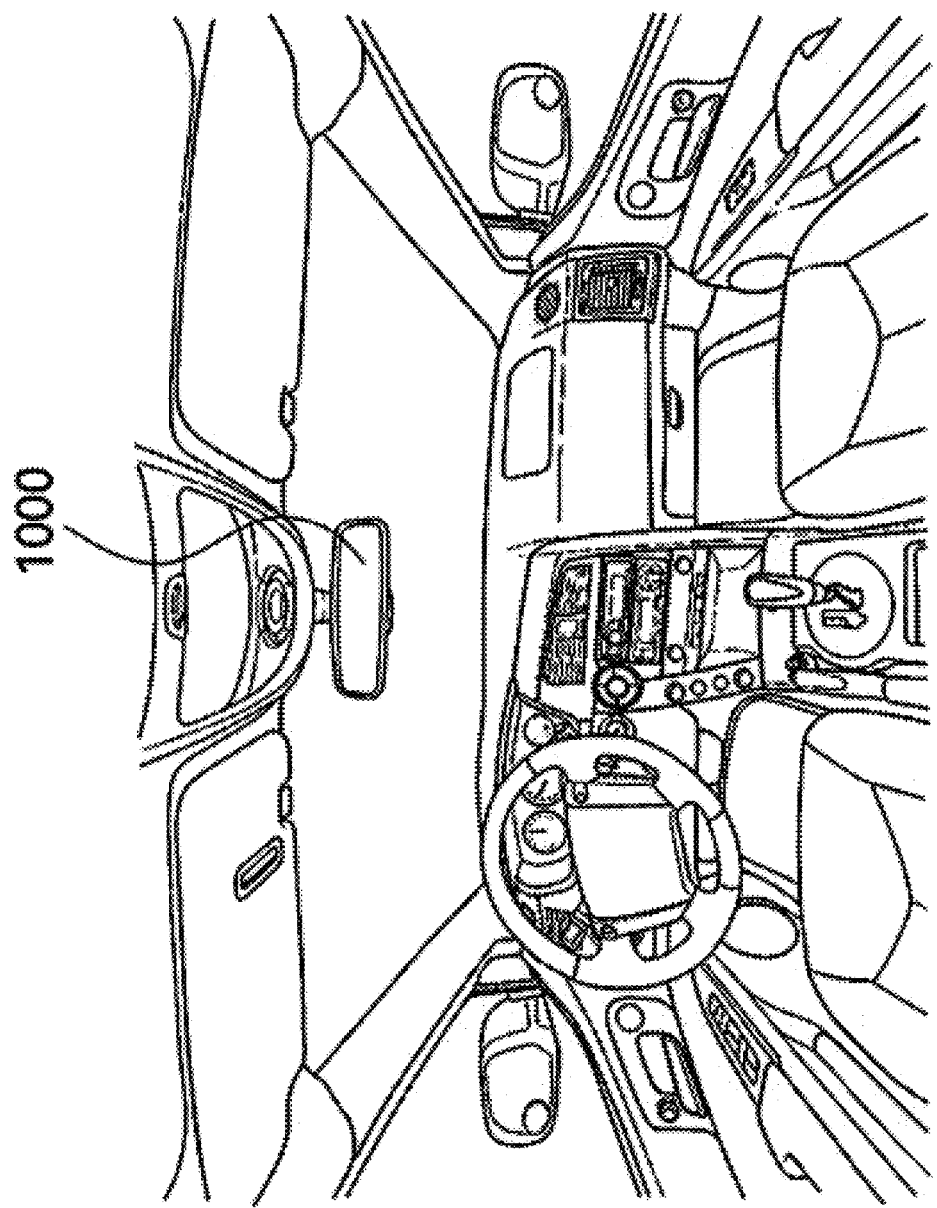
FIG. 1 is a view showing the inside of a vehicle equipped with a rearview mirror device according to a first embodiment.

The foregoing objects, features and advantages of the present disclosure will become more apparent from the following detailed description related to accompanying drawings. However, various modifications may be applied to the present disclosure, and the present disclosure may have various embodiments. Hereinafter, specific embodiments, which are illustrated in the drawings, will be described in detail.

In the drawings, the thicknesses of layers and regions are exaggerated for clarity. When it is indicated that an element or layer is "on" or "above" another element or layer, this includes a case in which another layer or element is interposed therebetween as well as a case in which the element or layer is directly above the other element or layer. In principle, like reference numerals designate like elements throughout the specification. In the following description, like reference numerals are used to designate elements which have the same function within the same idea illustrated in the drawings of each embodiment.

When detailed description of known functions or configurations related to the present disclosure is deemed to unnecessarily blur the gist of the disclosure, the detailed description thereof will be omitted. Also, numerals (e.g., first, second, etc.) used in the description herein are merely identifiers for distinguishing one element from another element.

In addition, the terms "module" and "unit" used to refer to elements in the following description are given or used in combination only in consideration of ease of writing the specification, and the terms themselves do not have distinct meanings or roles.

Furthermore, the use of a singular term, such as, "a" is not to be interpreted as limiting the number of components or details of particular components. Additionally, various terms and/or phrases describing or indicating a position or directional reference such as, but not limited to, "top", "bottom", "front", "rear", "forward", "rearward", "end", "outer", "inner", "left", "right", "vertical", "horizontal", etc. may relate to one or more particular components as seen generally from a user's vantage point during use or operation, and such terms and/or phrases are not to be interpreted as limiting, but merely as a representative basis for describing the disclosure to one skilled in the art.

Hereinafter, elements of a rearview mirror device according to an embodiment of the present disclosure will be described in detail with reference to the accompanying drawings.

In the specification, "rearview mirror device" is an interior mirror for vehicles that is in particular mounted on an inner surface of a vehicle windshield to provide a field of view behind the vehicle to a driver.

Also, in the specification, the "rearview mirror device" may further provide the driver of the vehicle with an anti-glare function related to light entering from the behind the vehicle.

Also, in the specification, the "rearview mirror device" may further provide various additional functions, and various components for providing the additional functions may be integrated in the interior of the device.

For example, the various components may include a humidity or temperature sensor configured to detect environment in an interior of the vehicle, a camera sensor or a motion sensor configured to monitor motion and/or condition of the driver of the vehicle, a display unit configured to provide the driver of the vehicle with various pieces of information, a microphone, a wireless communication unit (e.g., Wi-Fi, Bluetooth, etc.) and an antenna, a compass sensor, a module for payment of various fees such as a highway toll, an interface for controlled area network (CAN) communication, lighting, a navigation system, and an input module (e.g., a button, a touch sensor, or the like) corresponding to each of the above-described functions.

Meanwhile, the various components for providing the additional functions may be disposed on one or more circuit boards which will be described below. Alternatively, the input module corresponding to each of the above-described functions may be provided on a housing, a housing cover, or a rearview element which will be described below.

In the specification, "operation" or "action" of a rearview device like an interior mirror for vehicles describes any kind of (additional) function fulfilled by the rearview device.

Figure 2:
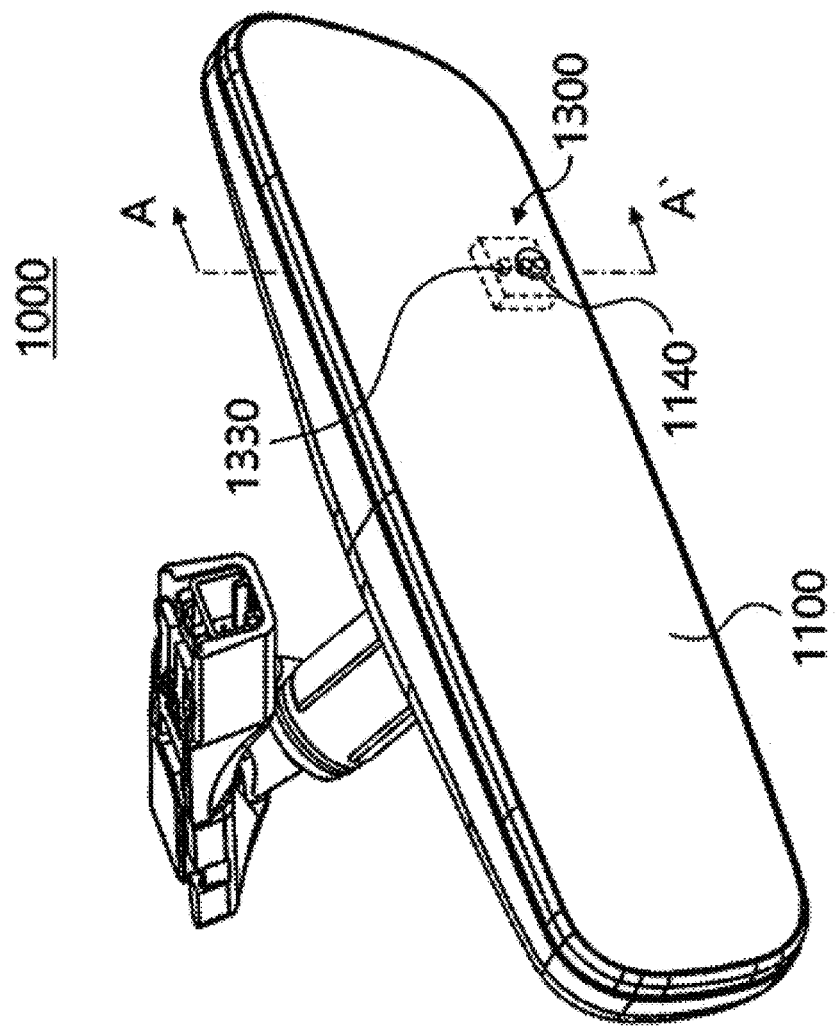
FIG. 2 is a perspective view of the rearview mirror device according to the first embodiment.
Figure 3:
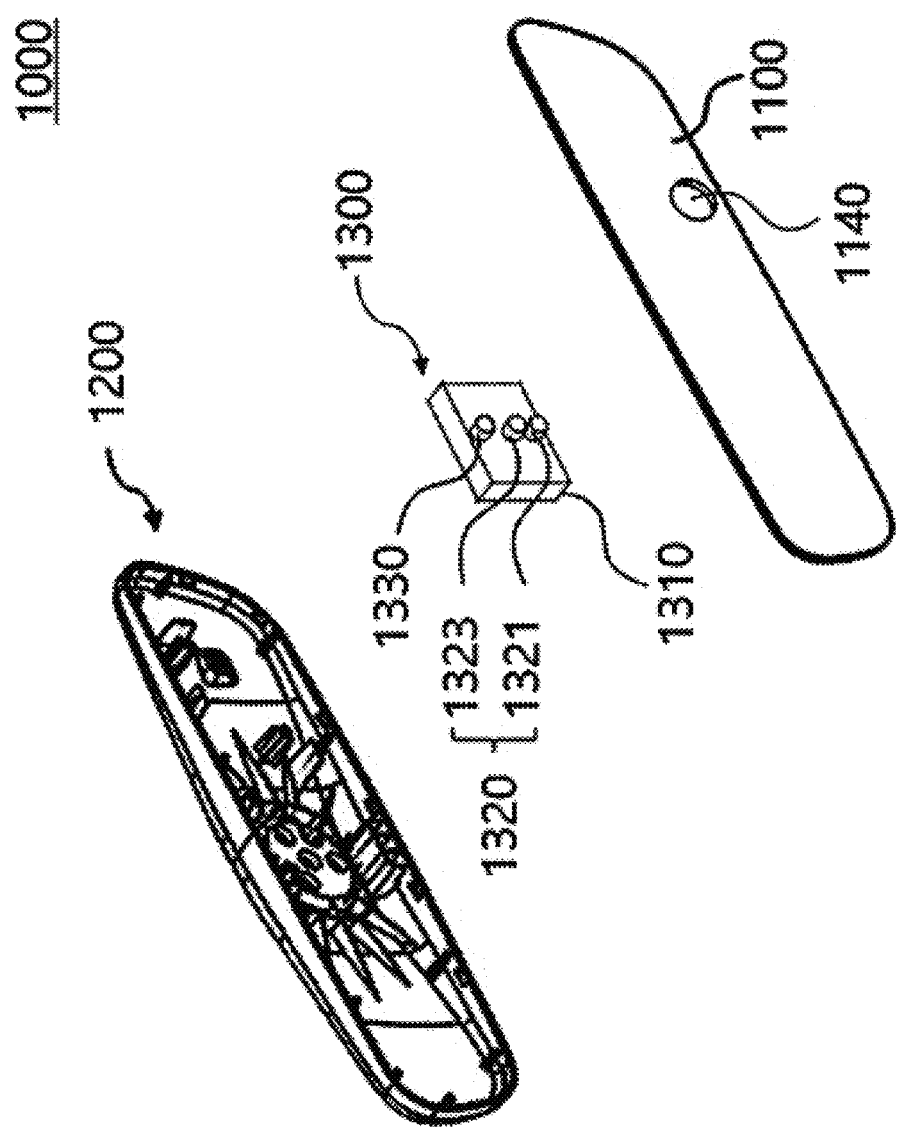
FIG. 3 is an exploded perspective view of the rearview mirror device according to the first embodiment.

FIG. 1 is a view showing the inside of a vehicle equipped with a rearview mirror device according to a first embodiment. FIG. 2 is a perspective view of the rearview mirror device according to the first embodiment. FIG. 3 is an exploded perspective view of the rearview mirror device according to the first embodiment.

Referring to FIGS. 1 to 3, a rearview mirror device 1000 according to the first embodiment is installed inside a vehicle.

The rearview mirror device 1000 may be mounted on an inner surface of the windshield of the vehicle to provide a user with a visual field of a rear region behind the vehicle.

The rearview mirror device 1000 may further provide a function of preventing glare caused by light coming from the region behind the vehicle toward the user of the vehicle through a mirror.

Alternatively, the rearview mirror device 1000 may provide the user of the vehicle with an image on the rear region with respect to the vehicle through a display.

The rearview mirror device 1000 may further provide various additional functions, and various parts for providing the additional functions may be integrated in the device.

The rearview mirror device 1000 may include a rearview element 1100, a housing 1200, and a user interface (UI) module 1300.

The rearview element 1100 may serve to reflect incident light. The rearview element 1100 may serve to reflect light input toward a front surface of the rearview element 1100.

A light transmitting region 1140 may be formed in the rearview element 1100. The light transmitting region 1140 may be a path of light passing through the rearview element 1100. The light transmitting region 1140 may deliver light emitted from the front surface of the rearview element 1100 to the inside of the rearview mirror device 1000. Also, the light transmitting region 1140 may deliver light output from the inside of the rearview mirror device 1000 toward the front surface of the rearview element 1100. That is, the light transmitting region 1140 may serve as a path for delivering light input from the user side into the rearview mirror device 1000. Also, the light transmitting region 1140 may serve as a path for delivering light output from the inside of the rearview mirror device 1000 to the user side.

The wavelength of the light output through the light transmitting region 1140 may correspond to the wavelength of the light input from the light transmitting region 1140. The wavelength of the light output through the light transmitting region 1140 may be equal to the wavelength of the light input from the light transmitting region 1140. Alternatively, the wavelength of the light output through the light transmitting region 1140 may be different from the wavelength of the light input from the light transmitting region 1140. A difference between the wavelength of the light output through the light transmitting region 1140 and the wavelength of the light input from the light transmitting region 1140 may be predefined.

Alternatively, the light transmitting region 1140 may reflect light input from the user side. The light transmitting region 1140 may reflect at least a portion of the light input from the user side. The light transmitting region 1140 may have a different reflectivity from other region of the rearview element 1100. The reflectivity of the light transmitting region 1140 may be lower than in other regions of the rearview element 1100.

The housing 1200 may support at least a portion of the rearview element 1100. The housing 1200 may support the rearview element 1100. The rearview element 1100 may be fastened to the housing 1200. The rearview element 1100 may be attached and fastened to the housing 1200.

The housing 1200 may be designed to have an inner space. The inside of the rearview mirror device 1000 may be defined by the inner space of the housing 1200. In the inner space of the housing 1200, parts for driving the rearview mirror device 1000 and parts for mounting the rearview mirror device 1000 onto the windshield of the vehicle may be accommodated. The rearview mirror device 1000 may be mounted on the windshield of the vehicle by the housing 1200.

The UI module 1300 may be located in the inner space of the rearview mirror device 1000. The UI module 1300 may be located between the rearview element 1100 and the housing 1200. The UI module 1300 may be located in a region adjacent to the rearview element 1100.

The UI module 1300 may detect the user's input. The UI module 1300 may detect the user's movement. The UI module 1300 may detect that a part of the user's body approaches the rearview element 1100. The UI module 1300 may detect that the user's finger approaches the rearview element 1100. Alternatively, the UI module 1300 may detect that the user's finger is brought into contact with the rearview element 1100.

The UI module 1300 may display the user's input. The UI module 1300 may output an operation of the rearview mirror device 1000 corresponding to the user's input. The UI module 1300 may display a change in state of the rearview mirror device 1000 corresponding to the user's input. The UI module 1300 may display operations of the various parts of the rearview mirror device 1000 corresponding to the user's input.

The UI module 1300 may include a printed circuit board 1310 and a sensor unit 1320.

The printed circuit board 1310 may be provided in the form in which a wire connected to the sensor unit 1320 is printed. The printed circuit board 1310 may be provided in the form in which an electronic circuit connected to the sensor unit 1320 is printed.

A controller may be mounted on the printed circuit board 1310. The controller and the sensor unit 1320 may be electrically connected to each other by the wire printed on the printed circuit board 1310.

The sensor unit 1320 may be mounted on the printed circuit board 1310. The sensor unit 1320 may be installed on a surface opposite to the rearview element 1100, which is one of both the surface of the printed circuit board 1310.

The sensor unit 1320 may detect the user's input. The sensor unit 1320 may detect that the user's finger approaches the rearview element 1100.

The sensor unit 1320 may include a light emitter 1321 and a light receiver 1323. The light emitter 1321 and the light receiver 1323 may be mounted on the printed circuit board 1310.

The light emitter 1321 may output light. The light emitter 1321 may output light having a specific wavelength. The light emitter 1321 may output light having a first wavelength. The light emitter 1321 may output light including a first wavelength. The light emitter 1321 may output light having a first wavelength to the rearview element 1100 side. The light emitter 1321 may output light having a first wavelength in a first direction through the light transmitting region 1140. The first direction may be a direction from the light emitter 1321 to the user. The light emitter 1321 may be a light emitting diode (LED).

The light receiver 1323 may receive light. The light receiver 1323 may receive light having a specific wavelength. The light receiver 1323 may receive light having a second wavelength. The light receiver 1323 may receive light having a wavelength corresponding to the light having the first wavelength. The second wavelength may correspond to the first wavelength. The second wavelength may be the same as the first wavelength. The second wavelength may be shifted by the first wavelength by a certain wavelength. The light receiver 1323 may receive light input from the rearview element 1100. The light receiver 1323 may receive light input in a second direction through the light transmitting region 1140. The second direction may be a direction from the user to the light receiver 1323. The first direction and the second direction may be different directions. The first direction and the second direction may be opposite directions.

The light emitter 1321 and the light receiver 1323 may form one component. The light emitter 1321 and the light receiver 1323 may be provided as one module. The light emitter 1321 and the light receiver 1323 may be provided as a photocoupler.

The UI module 1300 may further include an indicator 1330.

The indicator 1330 may be installed in the printed circuit board 1310. The indicator 1330 may be optionally provided.

The indicator 1330 may be electrically connected to the controller by the wire of the printed circuit board 1310. The indicator 1330 may provide information to the user under the control of the controller.

The indicator 1330 may be a light emitting module. The indicator 1330 may be turned on or off under the control of the controller. The indicator 1330 may have multiple states. The indicator 1330 may output multiple colors. The indicator 1330 may output light to the rearview element 1100 under the control of the controller.

The indicator 1330 may include at least one LED.

When the indicator 1330 is implemented using one solid-color LED, the LED may indicate information through turn-on or turn-off.

When the indicator 1330 is implemented using one multi-color LED, the LED may indicate information through different colors. For example, the indicator 1330 may indicate information with red, green, and blue.

When the indicator 1330 is implemented using multiple LEDs that output different colors, the indicator 1330 may indicate information through the different colors.

Figure 4:
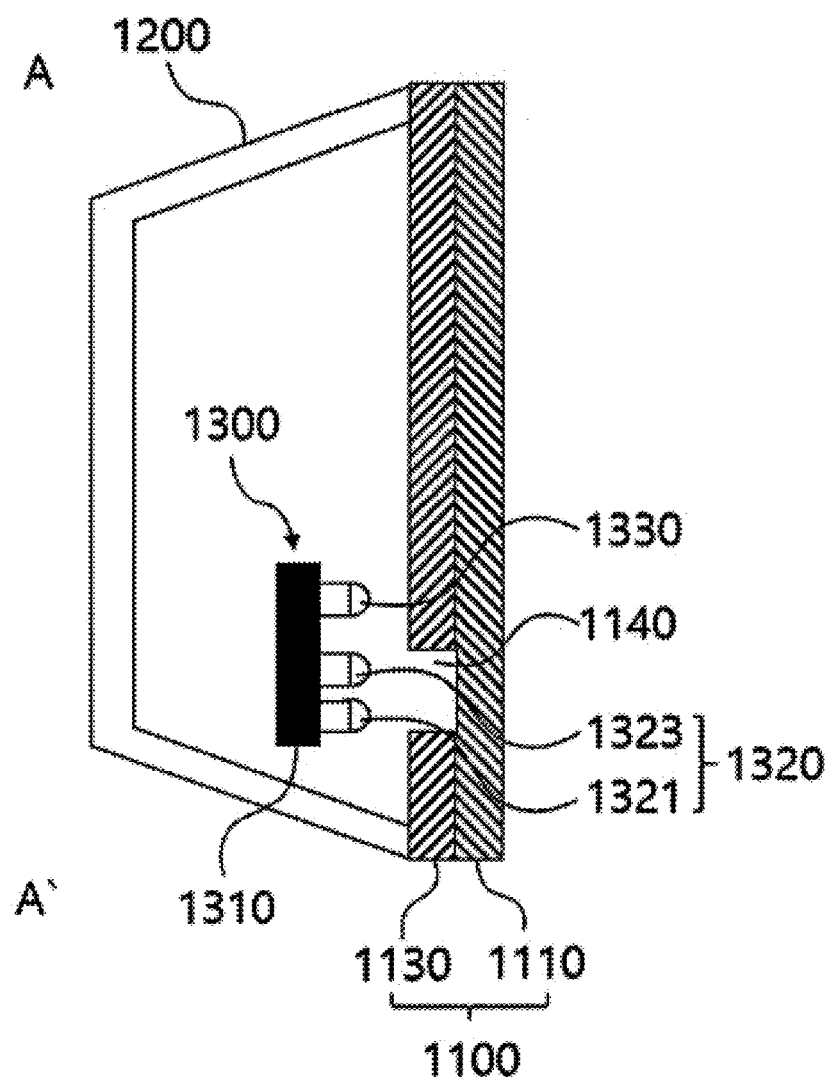
FIG. 4 is a sectional view of the rearview mirror device of FIG. 2 taken along A-A'.

FIG. 4 is a sectional view of the rearview mirror device of FIG. 2 taken along A-A'.

Referring to FIG. 4, the rearview mirror device 1000 according to the first embodiment may include a rearview element 1100, a housing 1200, and a UI module 1300.

The rearview element 1100 may include a substrate 1110 and a reflector 1130.

The substrate 1110 may be located on the user side, and the reflector 1130 may be located on the housing 1200 side.

The edge of the substrate 1110 may have a curved surface. The edge of the substrate 1110 may have a curvature. The substrate 1110 may have a first surface spaced apart from the reflector 1130 and a second surface adjacent to the reflector 1130. A side surface that connects the first surface and the second surface of the substrate 1110 may be formed in the shape of a curved surface. The first surface of the substrate 1110 may have a smaller area than the second surface. The side surface of the substrate 1110 may be formed in the shape of a curved surface capable of smoothly connecting the different areas of the first surface and the second surface.

Since the edge of the substrate 1110 is formed in the shape of a curved surface, it is possible to prevent an injury that may occur when a part of the user's body comes into contact with the edge of the substrate 1110.

The substrate 1110 may be formed of glass. Alternatively, the substrate 1110 may be made of plastic.

For example, a plastic substrate may be formed from a material selected from the group including polyacrylate, polyester, polystyrene, polyethylene, polypropylene, polyamides, polyamides, polycarbonate, epoxy, phenolic, acrylonitrile-butadiene-styrene, acrylonitrile-styrene-acrylates, acetal and blends of these. Preferred plastic substrate materials include polycarbonate, poly (2,2'-dihydroxyphenylpropane) carbonate, polydiethyleneglycol bis(allyl carbonate), polymethylmethacrylate and polystyrene, or blends thereof.

The substrate 1110 may be formed of a material capable of transmitting light.

The substrate 1110 and the reflector 1130 may form a stacked structure. The reflector 1130 may be formed by being coated onto the substrate 1110. The reflector 1130 may be coated onto the second surface of the substrate 1110. The reflector 1130 may be formed by a reflective material applied onto the substrate 1110. The reflector 1130 may be formed from a material selected from the group including silver, chromium, aluminum and mixtures thereof; and an oxide, nitride, boride, fluoride or carbide thereof, and mixtures thereof.

The substrate 1110 may be defined as a first layer, and the reflector 1130 may be defined as a second layer. The first layer may have a higher transmissivity than the second layer. The second layer may have a higher reflectivity than the first layer.

A light transmitting region 1140 may be formed in the reflector 1130. The thickness of the reflector 1130 is smaller in the light transmitting region 1140 than in the other regions. Alternatively, the light transmitting region 1140 may be a region from which the reflective material is removed. The light transmitting region 1140 may have a higher transmissivity than the other regions of the reflector 1130.

The UI module 1300 may include a printed circuit board 1310, a sensor unit 1320, and an indicator 1330. The sensor unit 1320 and the indicator 1330 may be opposite to the reflector 1130 and located on the printed circuit board 1310.

The sensor unit 1320 may be located in a region corresponding to the light transmitting region 1140. The light emitter 1321 and the light receiver 1323 may be located in the region corresponding to the light transmitting region 1140.

Light output from the light emitter 1321 may be output to the user side through the light transmitting region 1140 and the substrate 1110. Light output from the light emitter 1321 may be output to the user side through the light transmitting region 1140 and a region of the substrate 1110 corresponding to the light transmitting region 1140.

Light input from the substrate 1110 into the housing 1120 may be input to the light receiver 1323 via the substrate 1110 and the light transmitting region 1140. The light emitted from the substrate 1110 into the housing 1120 may be output to the light receiver 1323 via the substrate 1110 and the region of the substrate 1110 corresponding to the light transmitting region 1140.

The indicator 1330 may be located in the region corresponding to the light transmitting region 1140. Light output by the indicator 1330 may be output to the user side through the light transmitting region 1140 and the substrate 1110 and may provide information to the user.

Alternatively, the indicator 1330 may be located behind one region of the reflector, instead of the light transmitting region 1140. Even when the indicator 1330 is located behind the reflector 1130 to which the reflective material is coated, the light output from the indicator 1330 may pass through the reflector 1130 and the substrate 1110 and then may be output to the user. In this case, by using a high-intensity device as the indicator 1330, the light may pass through the reflector 1130 to provide information to the user. The indicator 1330 may output a light including specific wavelength penetrating through the reflector 1130.

While the reflector 1130 of the rearview element 1100 of FIG. 4 is formed in a single layer made of a reflective material, a reflector 1130 may be formed in a multi-layered structure. The reflector 1130 of the rearview element 1100 may be an electrochromic reflector.

A method of detecting an input of a user of the rearview mirror device according to the first embodiment will be described in detail with reference to FIGS. 5 to 8.

Figure 5:
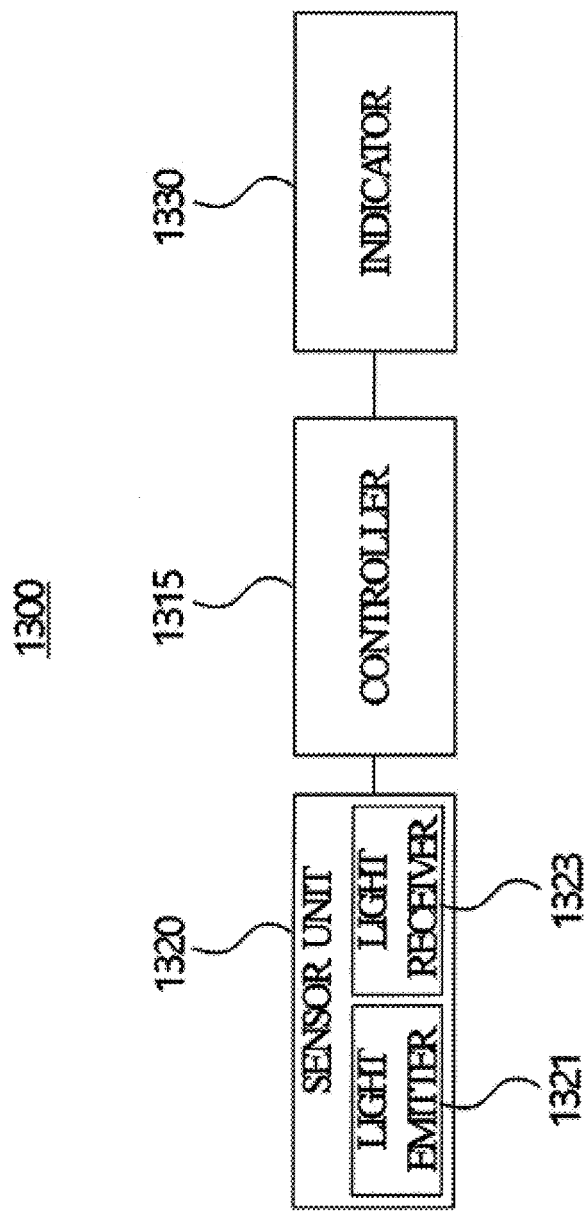
FIG. 5 is a block diagram showing the UI module according to the first embodiment.
Figure 6:
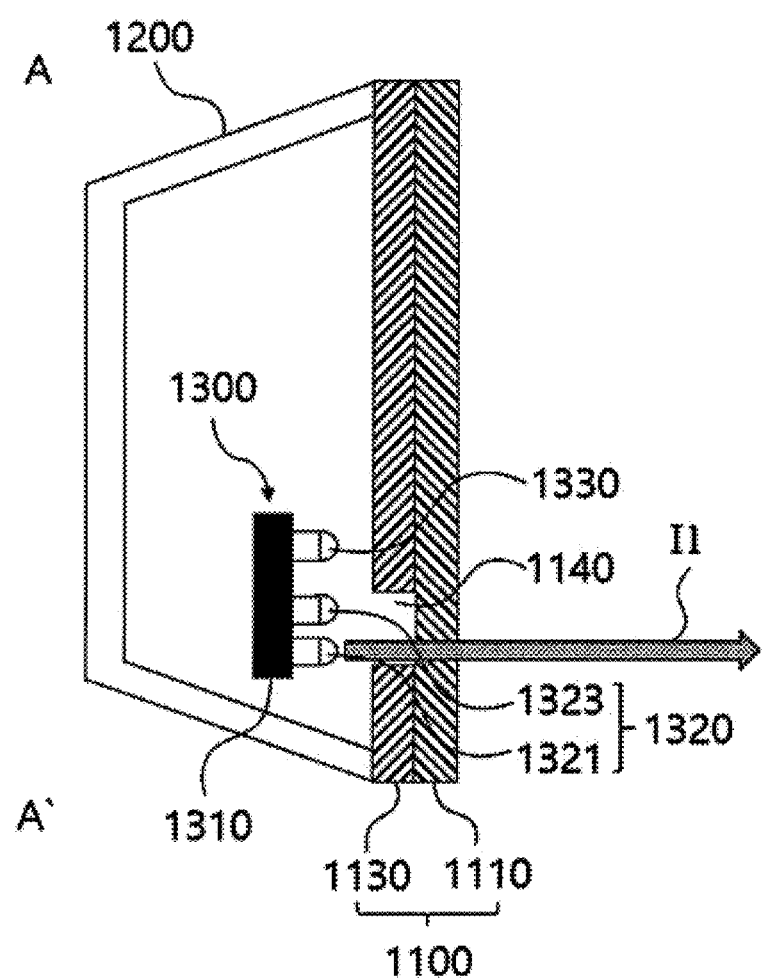
FIGS. 6 and 7 are diagrams showing a sensing process for the UI module according to the first embodiment.
Figure 7:
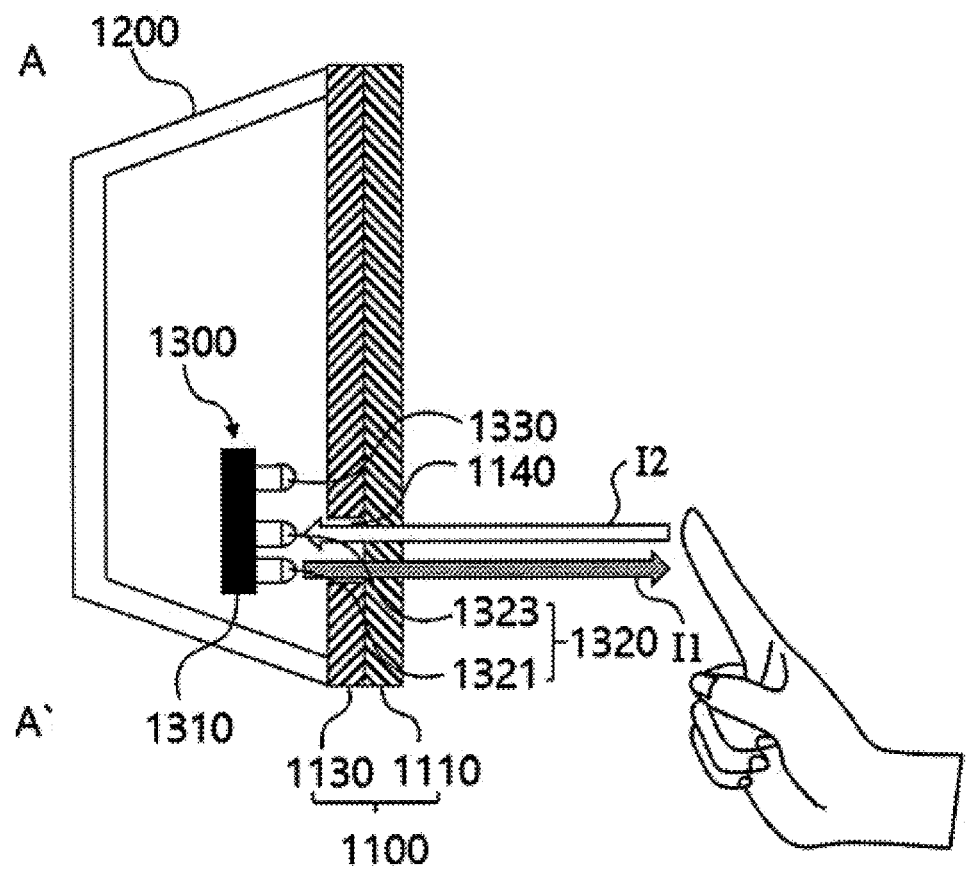
Figure 8:
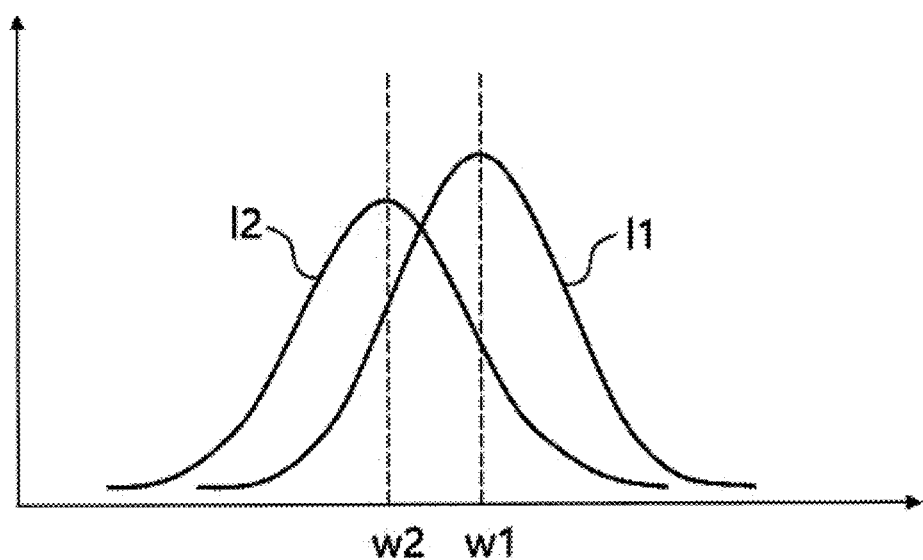
FIG. 8 is a diagram showing the wavelength of light output from the light emitter and the wavelength of light input to the light receiver according to the first embodiment.

FIG. 5 is a block diagram showing the UI module according to the first embodiment. FIGS. 6 and 7 are diagrams showing a sensing process for the UI module according to the first embodiment. FIG. 8 is a diagram showing the wavelength of light output from the light emitter and the wavelength of light input to the light receiver according to the first embodiment.

Referring to FIGS. 5 to 8, a UI module 1300 according to the first embodiment may include a controller 1315, a sensor unit 1320, and an indicator 1330.

The controller 1315 may control the sensor unit 1320 and the indicator 1330. The controller 1315 may be mounted on the printed circuit board 1310 in the form of a microcontroller or a chip.

The sensor unit 1320 may include a light emitter 1321 and a light receiver 1323. The light emitter 1321 may output light under the control of the controller 1315. The light receiver 1323 may convert light received from the outside into an electrical signal and then deliver the electrical signal to the controller 1315.

The indicator 1330 may indicate information to the user under the control of the controller 1315. The indicator 1330 may output an optical signal under the control of the controller 1315 and then indicate to the user.

In the drawings, it is shown that the sensor unit 1320 and the indicator 1330 are controlled by the same controller 1315. However, the sensor unit 1320 and the indicator 1330 may have respective controllers and thus may be individually controlled by the controllers. Even in this case, the controller 1315 shown in the drawings may control the sensor unit 1320 and the indicator 1330 by transferring signals with the controllers of the sensor unit 1320 and the indicator 1330.

The light emitter 1321 may output light to the rearview element 1100 side under the control of the controller 1315. First light 11 output from the light emitter 1321 may be transmitted through the rearview element 1100 and then output toward the front surface of the rearview element 1100. The first light 11 may be output to the user side. The first light 11 may be transmitted through the light transmitting region 1140 and the substrate 1110 and then output to the user side.

The controller 1315 may perform control such that the light emitter 1321 outputs the first light 11 while the vehicle is operating. The controller 1315 may turn on the light emitter 1321 in synchronization with a start signal of the vehicle and may turn off the light emitter 1321 when the vehicle is shut off.

As shown in FIG. 8, the first light 11 may have a first wavelength w1. The first wavelength w1 may be a red wavelength.

As shown in FIG. 6, when a part of the user's body is not adjacent to the rearview mirror device 1000, the light output from the light emitter 1321 may not be input to the light receiver 1323. That is, when the user's finger is spaced at least a predetermined distance from the light transmitting region 1140, the first light 11 may not be input to the light receiver 1323.

The light transmitting region 1140 may be designed, in terms of size, such that the light originating from the light emitter 1321 is reflected by the reflector 1130 and thus is not input to the light receiver 1323.

Alternatively, a partial region of the reflector 1130 adjacent to the light transmitting region 1140 may be treated to cause diffuse reflection. That is, even when the first light 11 is input to the partial region of the reflector 1130 adjacent to the light transmitting region 1140, the partial region of the reflector 1130 may be treated such that the first light 11 is diffusely reflected. The partial region of the reflector 1130 adjacent to the light transmitting region 1140 may be treated to cause diffuse reflection through patterning. An additional material may be coated to the partial region of the reflector 1130 adjacent to the light transmitting region 1140 to induce diffuse reflection.

The light receiver 1323 may be designed such that the first light 11 is not input to the light receiver 1323 when the user's finger is spaced at least a predetermined distance from the light transmitting region 1140, and thus it is possible to prevent a malfunction of the rearview mirror device 1000.

On the contrary, the light receiver 1323 may receive at least a portion of the first light 11 even when the user's finger is spaced at least a predetermined distance from the light transmitting region 1140. That is, at least a portion of the first light 11 may be reflected by the reflector 1130 adjacent to the light transmitting region 1140 or by the substrate 1110 and then may be input to the light receiver 1323.

In this case, since the first light 11 input to the light receiver 1323 is constant, the light receiver 1323 outputs the same noise sensing value to the controller 1315. When the noise sensing value is delivered from the light receiver 1323, the controller 1315 may perform control such that an operating instruction is not output. That is, when the noise sensing value is delivered from the light receiver 1323, the controller 1315 may not output a state change instruction of the rearview mirror device 1000. The controller 1315 may prevent a malfunction by setting an operating-based sensing value to be greater than or equal to the noise sensing value.

As shown in FIG. 7, when a part of the user's body is adjacent to the rearview mirror device 1000, the first light 11 output from the light emitter 1321 may be reflected by the part of the user's body and then entered to the light receiver 1323. When the user's finger is spaced within a predetermined distance from the light transmitting region 1140, the first light 11 may be reflected by the user's finger and then entered to the light receiver 1323 in the form of second light12.

The light receiver 1323 may accumulate the second light12 and deliver a sensing value corresponding to the accumulated second light12 to the controller 1315. When the sensing value greater than or equal to an operating-based sensing value is delivered by the light receiver 1323, the controller 1315 may determine that the user's input is present.

When the user' finger and the light transmitting region 1140 are spaced within a certain distance from each other, the light receiver 1323 may deliver a sensing value greater than or equal to the operating-based sensing value to the controller 1315. That is, when the user' finger is not brought into contact with but spaced within a certain distance from the substrate 1110, the controller 1315 may determine that the user's input is present and thus may sense the user's input without the contact with the substrate 1110. As a result, it is possible to prevent fingerprints from being left, and thus it is possible to prevent the rearview mirror device 1000 from being stained. By preventing the rearview mirror device 1000 from being strained, a rear view image provided by the rearview mirror device 1000 may be delivered without distortion. Thus, it is possible to provide the user with safe driving environments.

The second light 12 may correspond to the first light 11. The second light 12 may have the same wavelength as the first light 11. Alternatively, as shown in FIG. 8, the second light 12 may have a different wavelength from the first light 11. That is, the second light 12 may have a second wavelength w2 different from the first wavelength w1.

When the first light 11 illuminates the user's finger, the wavelength of the first light 11 may be changed by the user's finger, and thus the second light 12 may be output. That is, the peak of the first wavelength w1 may have a different wavelength from the peak of the second wavelength w2. That is, the peak of the light emitted from the light emitter 1321 and the peak of light received by the light receiver 1323 may appear at different wavelengths.

The light receiver 1323 may be designed to sense the light including the second wavelength w2. In this case, the user's input may be detected without being affected by the light emitted by the light emitter 1321, and thus it is possible to improve the accuracy of input recognition by the user by means of a simpler structure.

Figure 9:
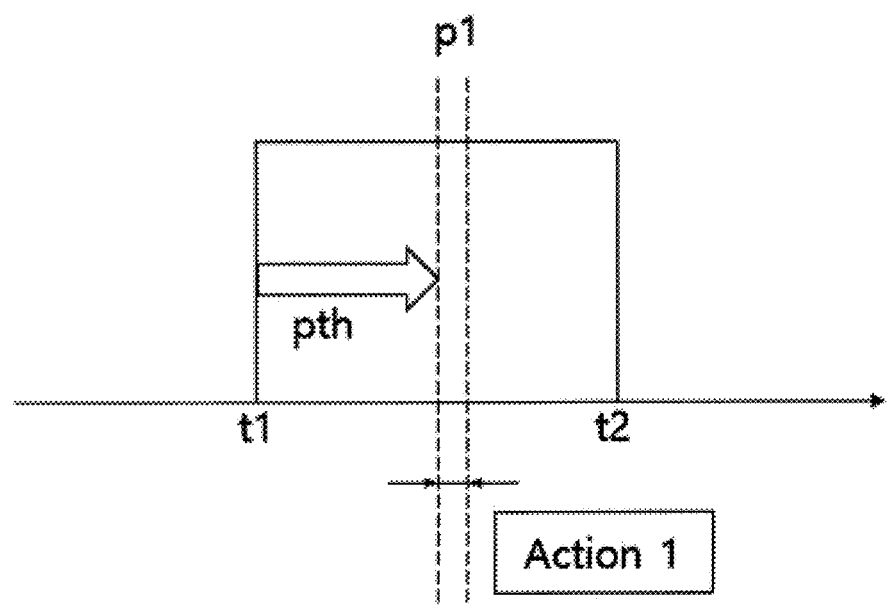
FIG. 9 is a diagram showing an operating instruction output corresponding to a sensing value of the controller according to the first embodiment.

FIG. 9 is a diagram showing an operating instruction output corresponding to a sensing value of the controller according to the first embodiment.

Referring to FIG. 9, the controller 1315 according to the first embodiment receives the sensing value from the light receiver 1323.

The light receiver 1323 may output the sensing value corresponding to the second light 12. That is, the light receiver 1323 may output the sensing value to the controller 1315 without comparing the sensing value to the operating-based sensing value. In this case, the controller 1315 may determine whether the sensing value received from light receiver 1323 is greater than or equal to the operating-based sensing value. That is, the controller 1315 may determine that a signal having a sensing value less than the operating-based sensing value is noise and may process only a signal having a sensing value greater than or equal to the operating-based sensing value as a valid signal.

Also, only when the sensing value is greater than or equal to the operating-based sensing value, the light receiver 1323 may deliver the signal to the controller 1315. In this case, when the signal is received from the light receiver 1323, the controller 1315 may process the signal as a valid signal.

When the valid signal is received, the controller 1315 determines whether valid signals are consecutively input for a predetermined period of time. When valid signals are consecutively input for a predetermined period of time, the controller 1315 determines that the input is made by the user and instructs to perform a first operation.

For example, when valid signals are input from a first time point t1 to a second time point t2, the controller 1315 starts counting at the first time point t1 to determine whether valid signals are input during a valid period pth. That is, when it is determined that valid signals are input for the valid period pth starting from the first time point t1, the controller 1315 may instruct to perform the first operation.

The valid period pth may range from 20 ms to 1 sec.

When valid signals are input for at least the valid period pth, the controller 1315 determines that the input is made by the user, and thus it is possible to prevent a malfunction that may occur due to external environments.

The time point at which it is determined by the controller 1315 that valid signals are input for the valid period pth starting from the first time point t1 and the time point at which the first operation is performed may be the same.

Alternatively, the time point at which it is determined by the controller 1315 that valid signals are input for the valid period pth starting from the first time point t1 and the time point at which the first operation is performed may be different.

Even though an instruction to perform the first operation is delivered at the same time when it is determined by the controller 1315 that valid signals are input for the valid period pth starting from the first time point t1, the first operation may be performed after a delay of a first period p1 by an internal operating algorithm of the rearview mirror device 1000.

Alternatively, the controller 1315 may instruct to perform the first operation at the first period p1 after the valid period pth.

When it is determined that the input is made by the user, the controller 1315 may change the state of the indicator 1330 to indicate the user that the input has been recognized.

Through vibration or sound, the controller 1315 may indicate the user that the input has been recognized.

When the rearview element 1100 is an electrochromic mirror, the first operation may include turning on/off the electrochromic mirror or changing the reflectivity of the electrochromic mirror.

When the rearview element 1100 is a display mirror, the first operation may include turning on/off the display mirror, zooming in/out, adjusting brightness, panning/tilting, controlling contrast, controlling an aspheric view, or the like.

Alternatively, the first operation may be an operation for controlling a function of the rearview mirror device 1000 such as ETSC control, control of a camera installed in a vehicle, and control of a communication unit for opening a garage door or for controlling other elements electrically connected to the rearview mirror device 1000, and is not limited to the detailed description.

Figure 10:
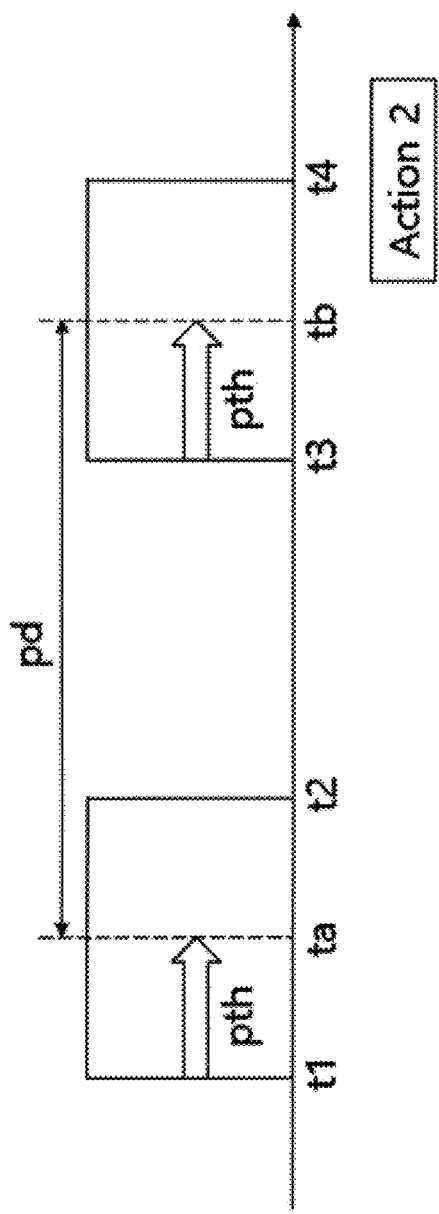
FIG. 10 is a diagram showing an operating instruction output corresponding to the consecutive inputs according to the first embodiment.

FIG. 10 is a diagram showing an operating instruction output corresponding to the consecutive inputs according to the first embodiment.

Referring to FIG. 10, the controller 1315 according to the first embodiment receives a sensing value from the light receiver 1323.

When consecutive signals are input from the user, the controller 1315 may instruct to perform a second operation different from the first operation.

For example, when valid signals are input from the first time point t1 to the second time point t2 and from the third time point t3 to the fourth time point t4, the controller 1315 may instruct to perform the second operation. Even in this case, as shown in FIG. 9, only when the valid signals are maintained for the valid period pth, the controller 1315 may determine that the input is made by the user.

Also, only when a period between a first valid input and a second valid input of the user is within a predefined time, the controller 1315 determines that the inputs are consecutive and may perform control to perform the second operation.

That is, only when a difference between a time point ta at which it is first determined that the input is made by the user and a time point tb at which it is second determined that the input is made by the user is within a predefined time pd, the controller 1315 may perform control to perform the second operation. Here, the time point ta at which it is first determined that the input is made by the user may be a time point at which the valid period pth has passed after the first time point t1 at which the valid signal is input. Also, the time point tb at which it is second determined that the input is made by the user may be a time point at which the valid period pth has passed after the second time point t2 at which the valid signal is input.

Only when the period between the first valid input and the second valid input of the user is within the predefined time, the controller 1315 may determine that the inputs are consecutive and may perform control to perform the second operation, thereby controlling the rearview mirror device 1000 with accurate consideration of the user's intention.

The second operation may include sub-operations performed through the first operation. When the rearview element 1100 is a display mirror, the second operation may be a switching operation between the display mirror and a normal mirror.

Figure 11:
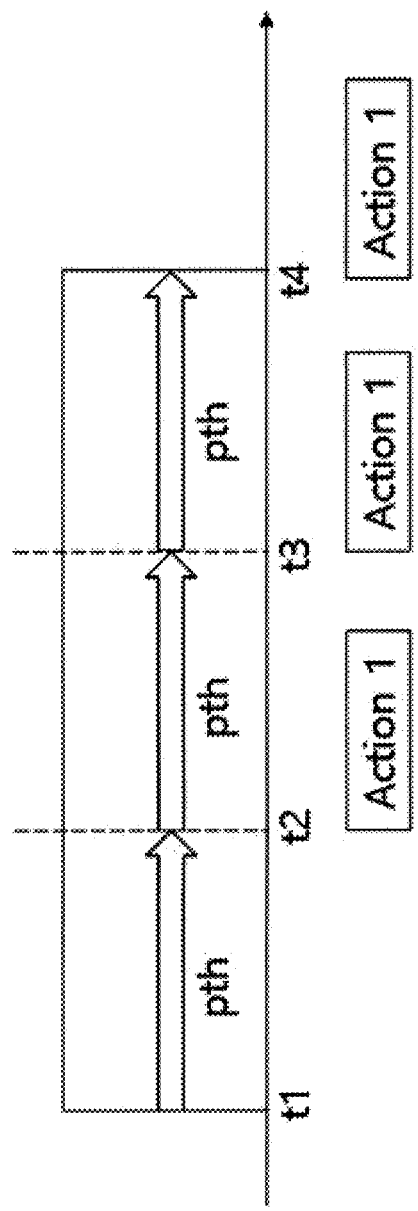
FIG. 11 is a diagram showing an operating instruction output corresponding to a continuous input according to the first embodiment.

FIG. 11 is a diagram showing an operating instruction output corresponding to a continuous input according to the first embodiment.

Referring to FIG. 11, the controller 1315 according to the first embodiment receives a sensing value from the light receiver 1323.

When a continuous signal is input from the user, the controller 1315 may instruct to perform the first operation multiple times.

For example, when a valid signal is input from the first time point t1 to the fourth time point t4, the controller 1315 may instruct to perform the first operation three times.

That is, when a valid signal is input from the first time point t1 to the second time point t2, which is the valid period pth after the first time point t1, the controller 1315 may first perform the first operation. When a valid signal is input from the second time point t2 to the third time point t3, which is the valid period pth after the second time point t2, the controller 1315 may second perform the first operation. When a valid signal is input from the third time point t3 to the fourth time point t4, which is the valid period pth after the third time point t3, the controller 1315 may third perform the first operation.

That is, when a valid signal is input from the first time point t1 to the fourth time point t4, the controller 1315 may perform control to perform the first operation a number of times corresponding to the number of times the valid period pth passes during a period from the first time point t1 to the fourth time point t4.

The first operation corresponding to the continuous input may include the first operation of FIG. 9.

More appropriately, the first operation corresponding to the continuous input may be suitable for control of a device that may be linearly controlled. For example, the first operation corresponding to the continuous input may be appropriately used for changing the reflectivity of the electrochromic mirror, changing the zooming of the display mirror, adjusting brightness, controlling panning/tilting, controlling contrast, adjusting speaker volume, and the like.

Figure 12:
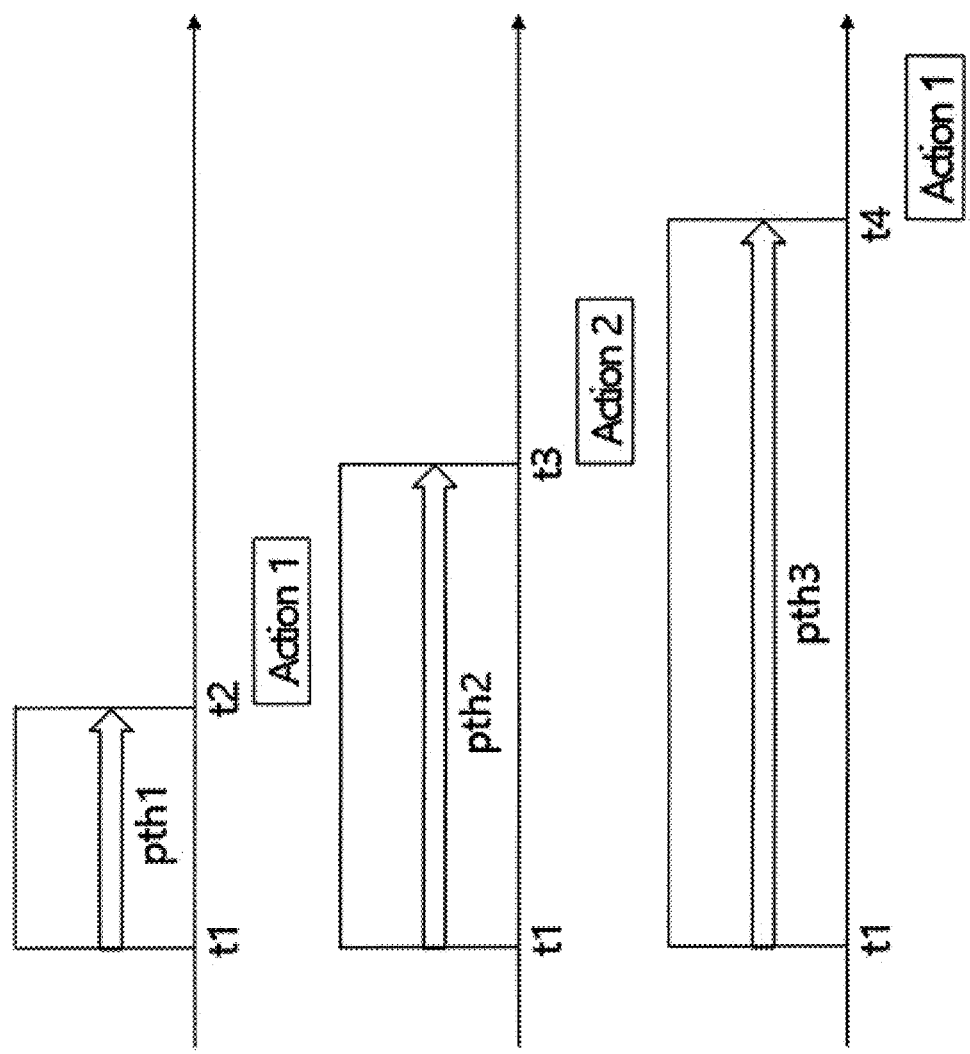
FIG. 12 is a diagram showing an operating instruction output corresponding to a continuous input according to the first embodiment, which is different from that of FIG. 11.

FIG. 12 is a diagram showing an operating instruction output corresponding to a continuous input according to the first embodiment, which is different from that of FIG. 11.

Referring to FIG. 12, the controller 1315 according to the first embodiment receives a sensing value from the light receiver 1323.

Unlike FIG. 11, when a continuous signal is input from the user, the controller 1315 may instruct to perform different operations depending on a period during which a valid signal is input.

For example, when a valid signal is input from the first time point t1 to the second time point t2, the controller 1315 may perform control to perform the first operation. Also, when a valid signal is input from the first time point t1 to the third time point t3, the controller 1315 may perform control to perform the second operation. Also, when a valid signal is input from the first time point t1 to the fourth time point t4, the controller 1315 may perform control to perform a third operation.

That is, the controller 1315 may perform control to perform the first operation when a valid signal is input during a first valid period pth1, may perform control to perform the second operation when a valid signal is input during a second valid period pth2, and may perform control to perform the third operation when a valid signal is input during a third valid period pth3.

The first to third operations may be different from one another. Alternatively, the first to third operations may be the same operation with different levels. For example, when the first controller 1315 controls the reflectivity of the electrochromic mirror, the first operation may be an operation for a change by 10%, the second operation may be an operation for a change by 20%, and the third operation may be an operation for a change by 30%.

One of the operating instruction output corresponding to the continuous input shown in FIG. 11 and the operating instruction output corresponding to the continuous input shown in FIG. 12 may be selected through settings of the controller.

Figure 13:
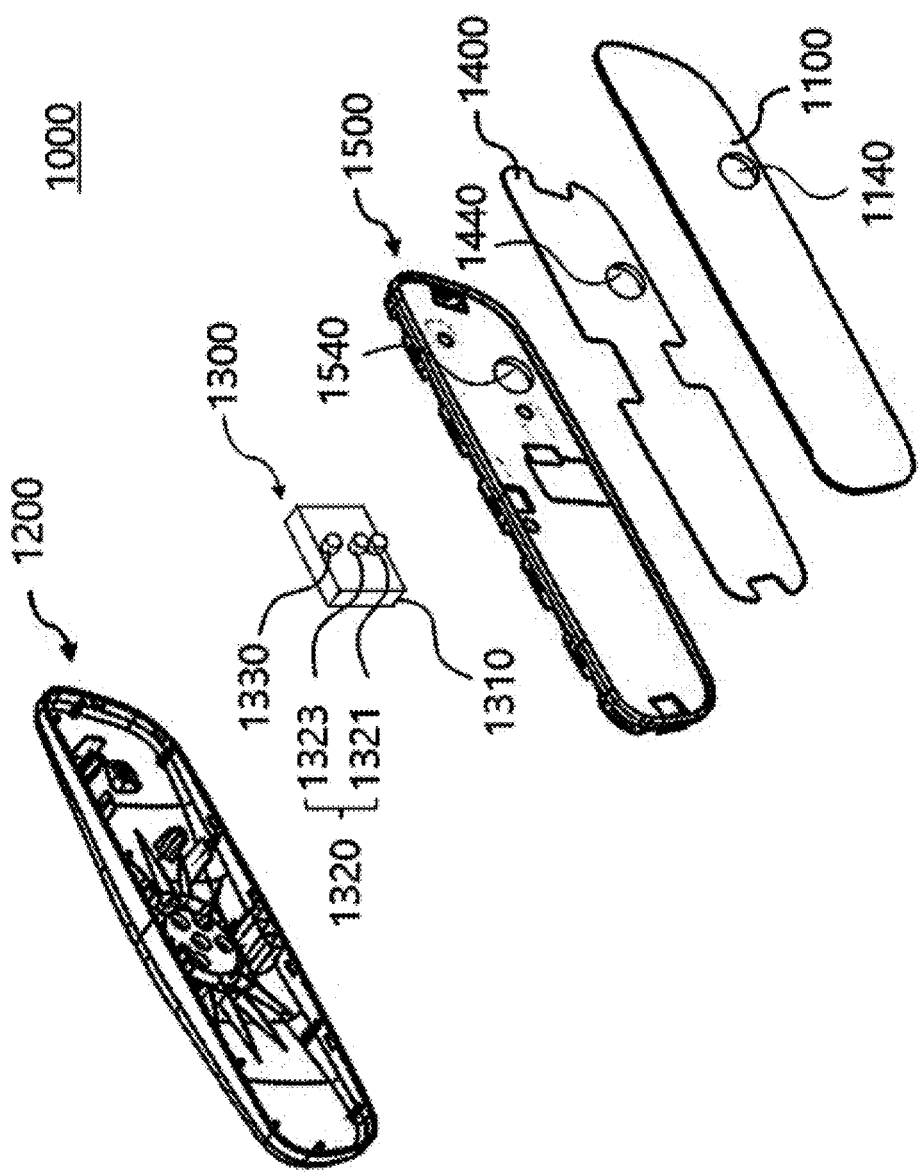
FIG. 13 is an exploded perspective view of the rearview mirror device according to the first embodiment.

FIG. 13 is an exploded perspective view of the rearview mirror device according to the first embodiment.

The rearview mirror device shown in FIG. 13 is the same as the rearview mirror device shown in FIG. 3, except for addition of an adhesive unit and a housing cover.

Referring to FIG. 13, the rearview mirror device according to the first embodiment may include a rearview element 1100, a housing 1200, a UI module 1300, an adhesive unit 1400, and a housing cover 1500.

The rearview element 1100 may be mounted on the housing cover 1500. The rearview element 1100 may be attached to the housing cover 1500. The rearview element 1100 may be attached to the housing cover 1500 by means of the adhesive unit 1400.

The edge of the substrate of the rearview element 1100 may be planar.

The edge of the housing cover 1500 may have a curved surface. The center region of the housing cover 1500 may have a stepped portion with respect to the edge in order to mount the rearview element 1100. The center region of the housing cover 1500 may be recessed toward the housing 1200. The center region of the housing cover 1500 may be recessed toward the housing 1200 by the thicknesses of the rearview element 1100 and the adhesive unit 1400.

The housing cover 1500 may be coupled to the housing 1200.

The UI module 1300 may be disposed between the housing 1200 and the housing cover 1500. The UI module 1300 may be disposed in an inner space defined by the housing 1200.

The adhesive unit 1400 may attach the rearview element 1100 to the housing cover 1500. The adhesive unit 1400 may have a size corresponding to the rearview element 1100. The adhesive unit 1400 may have a smaller area than the rearview element 1100.

The adhesive unit 1400 may be a double-sided tape. The adhesive unit 1400 may have one side adhered to the rearview element 1100 and the other side adhered to the housing cover 1500.

A light transmitting region 1140 may be formed in the rearview element 1100. An adhesive-layer-specific light transmitting region 1440 may be formed in the adhesive unit 1400. A housing-cover-specific light transmitting region 1540 may be formed in the housing cover 1500. The adhesive-layer-specific light transmitting region 1440 and the housing-cover-specific light transmitting region 1540 may be formed with a size corresponding to the light transmitting region 1140 at a position corresponding to the light transmitting region 1140. The sensor unit 1320 of the UI module 1300 may be located at a position corresponding to the light transmitting region 1140, the adhesive-layer-specific light transmitting region 1440, and the housing-cover-specific light transmitting region 1540. Light output by the sensor unit 1320 may be delivered to the outside through the housing-cover-specific light transmitting region 1540, the adhesive-layer-specific light transmitting region 1440, and the light transmitting region 1140. Also, light entered from the outside may be delivered to the sensor unit 1320 through the light transmitting region 1140, the adhesive-layer-specific light transmitting region 1440, and the housing-cover-specific light transmitting region 1540.

Figure 14:
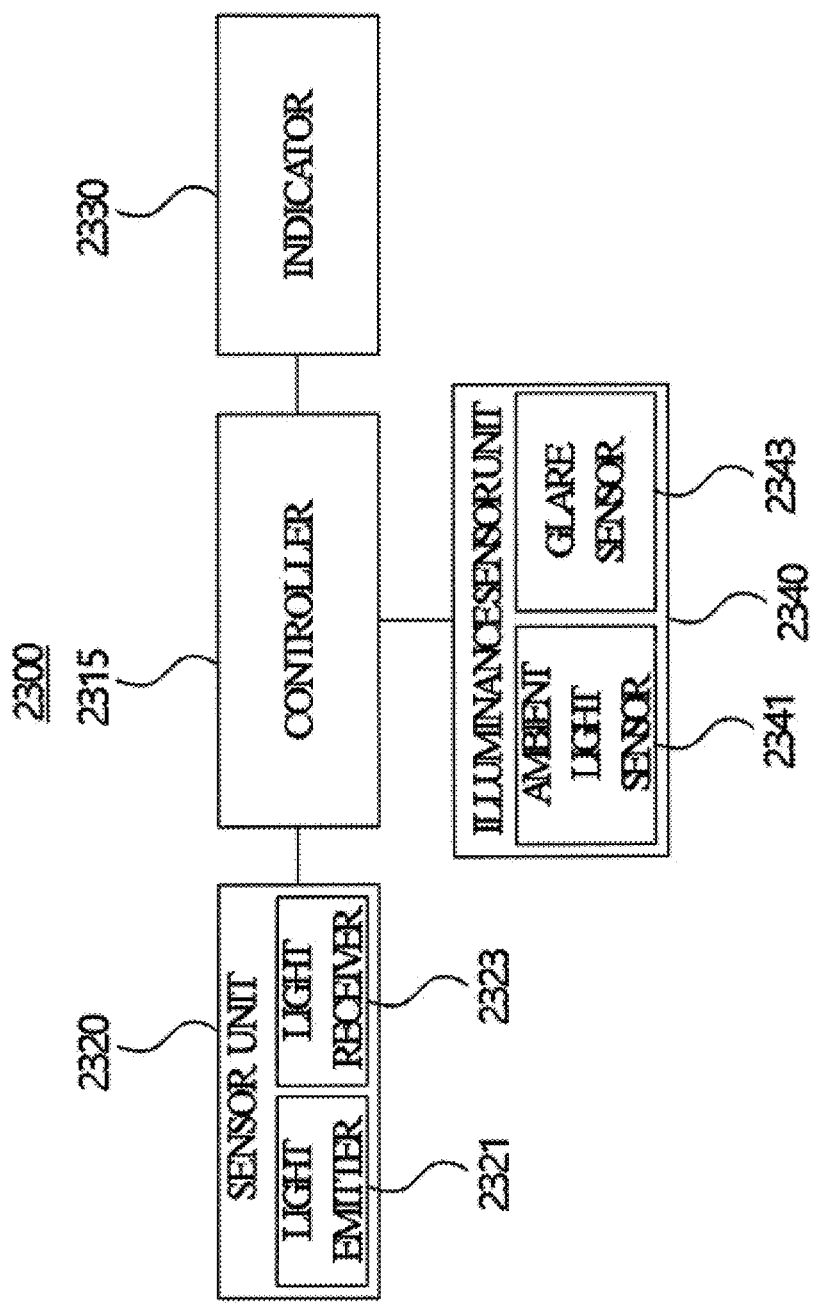
FIG. 14 is a block diagram showing a UI module according to a second embodiment.

FIG. 14 is a block diagram showing a UI module according to a second embodiment.

A rearview mirror device according to the second embodiment is the same as the rearview mirror device according to the first embodiment, except that an illuminance sensor unit is additionally included, the rearview element has a different structure, and the controller has a different role. Accordingly, in the following description of the second embodiment, a detailed description of elements common to the first embodiment will be omitted.

Referring to FIG. 14, the rearview mirror device according to the second embodiment includes a rearview element and a UI module 2300.

The UI module 2300 may include a controller 2315, a sensor unit 2320, an indicator 2330, and an illuminance sensor unit 2340.

The controller 2315 may control the sensor unit 2320, the indicator 2330, and the illuminance sensor unit 2340.

The sensor unit 2320 may include a light emitter 2321 and a light receiver 2323.

The illuminance sensor unit 2340 may sense an environment in which the rearview mirror device is located. The illuminance sensor unit 2340 may measure the illuminance of a space where the rearview mirror device is located. The illuminance sensor unit 2340 may measure the intensity of light input to the rearview mirror device. The illuminance sensor unit 2340 may measure the amount of light input from the outside to the rearview mirror device.

When the rearview element is an electrochromic mirror, the controller 2315 may change the reflectivity of the electrochromic mirror on the basis of the amount of light measured by the illuminance sensor unit 2340.

The illuminance sensor unit 2340 may include an ambient light sensor 2341 and a glare sensor 2343.

The ambient light sensor 2341 may be installed in the housing 1200. The ambient light sensor 2341 may be installed in a direction from a reflector 2130 to the housing 1200. The ambient light sensor 2341 may be installed toward the front of the vehicle. The ambient light sensor 2341 may be installed in a direction from the rearview mirror device to the windshield.

The ambient light sensor 2341 may sense daytime and nighttime. The ambient light sensor 2341 may measure light input toward the rearview mirror device through the windshield to sense daytime and nighttime.

The glare sensor 2343 may be installed in an inner space of the rearview mirror device. The glare sensor 2343 may be installed in a direction other than that of the ambient light sensor 2341. The glare sensor 2343 may be installed toward a rear region behind the vehicle. The glare sensor 2343 may be installed in a direction from the rearview mirror device to a rear window of the vehicle.

The glare sensor 2343 may sense light emitted from the rear region, which is behind the vehicle, to the vehicle. The glare sensor 2343 may sense light output by a headlamp of the vehicle located on the rear of the vehicle.

The controller 2315 may adjust the reflectivity of the rearview element on the basis of a sensing value received from the illuminance sensor unit 2340. The controller 2315 may sense daytime and nighttime and also sense light emitted from the rear region on the basis of values measured by the ambient light sensor 2341 and the glare sensor 2343 and may adjust the reflectivity of the rearview element.

The controller 2315 may change the operating-based sensing value on the basis of a value measured by the illuminance sensor unit 2340. For example, the controller 2315 may apply a relatively high operating-based sensing value when it is daytime and may apply a relatively low operating-based sensing value when it is nighttime.

Also, when it is nighttime, the controller 2315 may apply the same operating-based sensing value regardless of the value measured by the glare sensor 2343 and also may change the operating-based sensing value in conjunction with the value measured by the glare sensor 2343.

For example, during nighttime, the controller 2315 may lower the operating-based sensing value when a large amount of light is measured by the glare sensor 2343 and may raise the operating-based sensing value when a small amount of light is measured by the glare sensor 2343.

By controlling the operating-based sensing value in conjunction with ambient environments as described above, a driver's input may be more accurately determined, and thus it is possible to prevent malfunctions.

The controller 2315 may set the same operating-based sensing value regardless of whether it is daytime or nighttime. In this case, the controller 2315 may define, as a reference, an operating-based sensing value corresponding to when the reflector 2130 has the minimum reflectivity. The controller 2315 may determine the user's operation using one operation-based sensing value regardless of the amount of light measured by the illuminance sensor unit 2340, and thus it is possible to simplify an algorithm and a circuit configuration, thereby reducing manufacturing cost.

Figure 15:
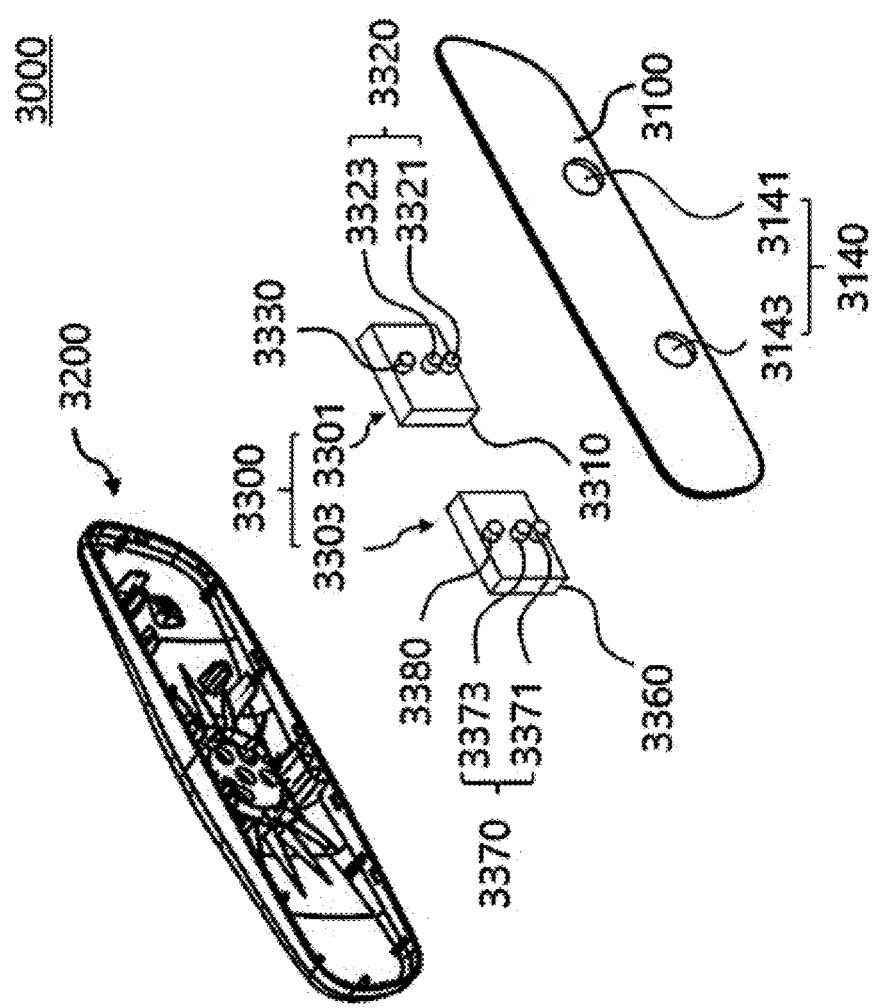
FIG. 15 is a perspective view showing a rearview mirror device according to a third embodiment.
Figure 16:
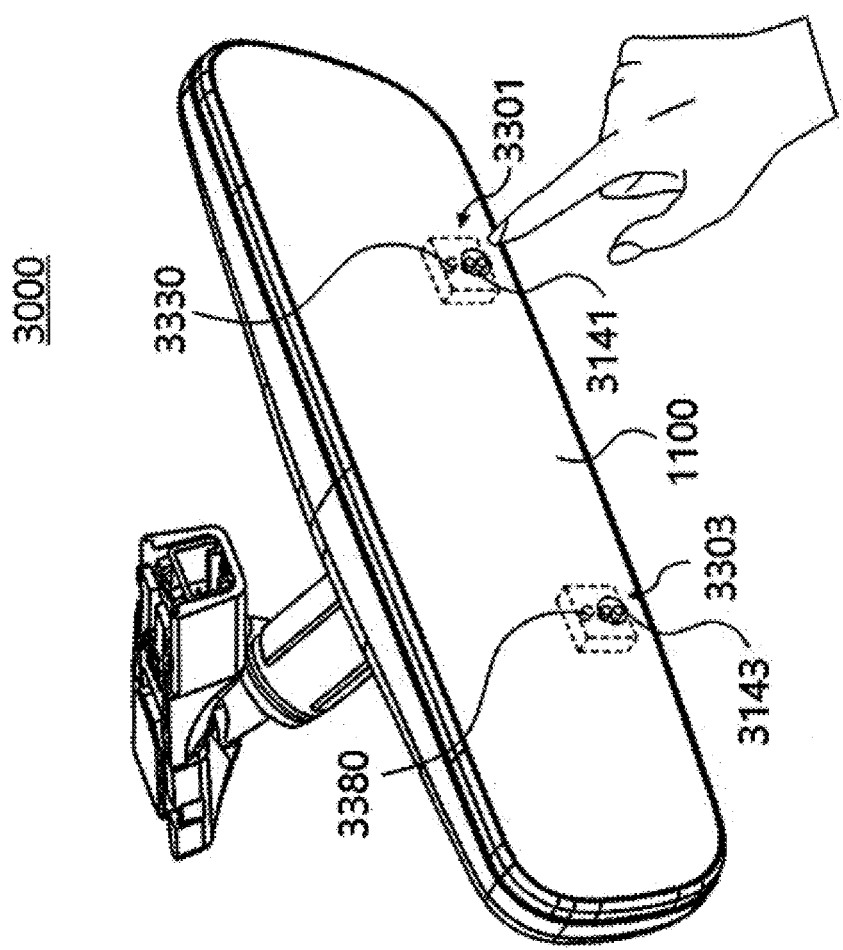
FIG. 16 is a first state diagram showing a user input for the rearview mirror device according to the third embodiment.
Figure 17:
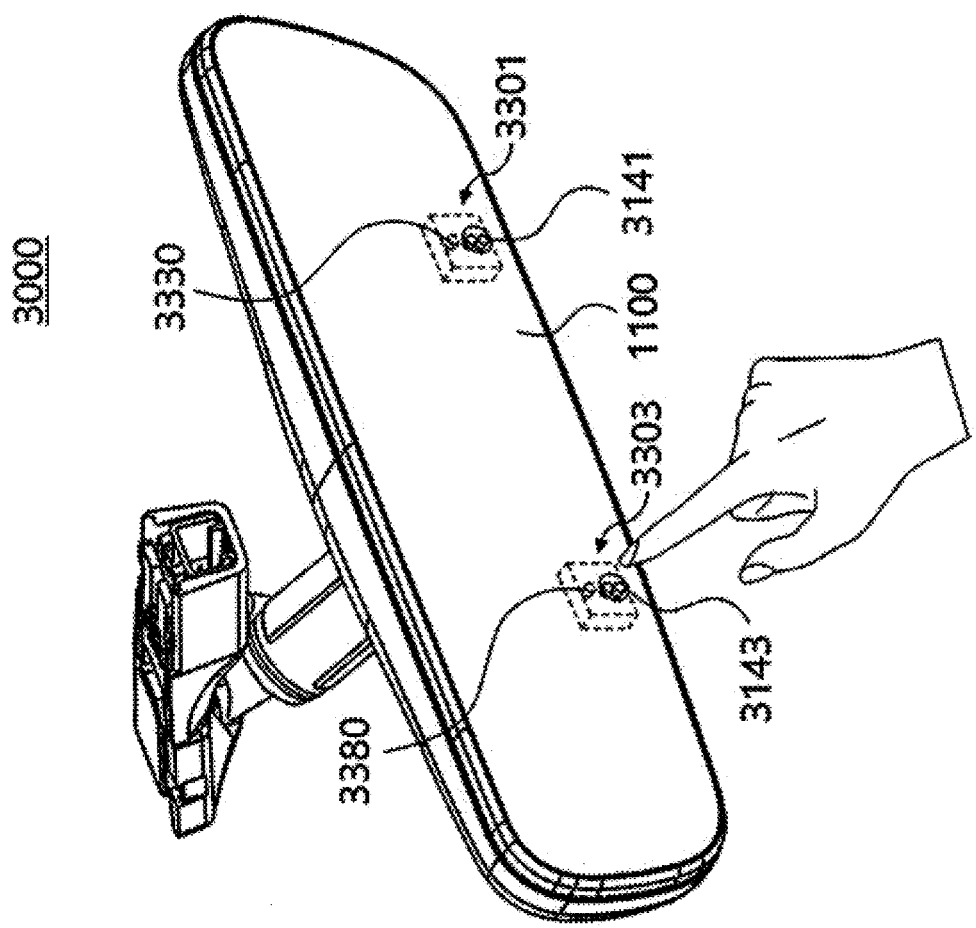
FIG. 17 is a second state diagram showing a user input for the rearview mirror device according to the third embodiment.

FIG. 15 is a perspective view showing a rearview mirror device according to a third embodiment. FIG. 16 is a first state diagram showing a user input for the rearview mirror device according to the third embodiment. FIG. 17 is a second state diagram showing a user input for the rearview mirror device according to the third embodiment.

The rearview mirror device according to the third embodiment is the same as that of the first embodiment, except that the user input is processed using two UI modules. Accordingly, in the following description of the third embodiment, a detailed description of elements common to the first embodiment will be omitted.

Referring to FIGS. 15 to 17, the rearview mirror device according to the third embodiment may include a rearview element 3100, a housing 3200, and a UI module 3300.

A light transmitting region 3140 may be formed in the rearview element 3100. The light transmitting region 3140 may be a path of light passing through the rearview element 3100.

The light transmitting region 3140 may include a first light transmitting region 3141 and a second light transmitting region 3143. The first light transmitting region 3141 and the second light transmitting region 3143 may be spaced apart from each other. Each of the first light transmitting region 3141 and the second light transmitting region 3143 may be a path of light passing through the rearview element 3100. The first light transmitting region 3141 and the second light transmitting region 3143 may be formed to penetrate at least a portion of the rearview element 3100.

The UI module 3300 may include a first UI module 3301 and a second UI module 3303. The first UI module 3301 and the second UI module 3303 may be installed at positions corresponding to the first light transmitting region 3141 and the second light transmitting region 3143, respectively.

The first UI module 3301 may include a first printed circuit board 3310, a first sensor unit 3320, and a first indicator 3330. The first sensor unit 3320 may include a first light emitter 3321 and a first light receiver 3323. The first sensor unit 3320 may be installed at a position corresponding to the first light transmitting region 3141. Light output from the first light emitter 3321 may be output toward the driver through the first light transmitting region 3141. The light coming from the driver side may be input to the first light receiver 3323 through the first light transmitting region 3141.

The second UI module 3303 may include a second printed circuit board 3350, a second sensor unit 3370, and a second indicator 3380. The second sensor unit 3370 may include a second light emitter 3371 and a second light receiver 3373. The second sensor unit 3370 may be installed at a position corresponding to the second light transmitting region 3143. Light output from the second light emitter 3371 may be output toward the driver through the second light transmitting region 3143. The light coming from the driver side may be input to the second light receiver 3373 through the second light transmitting region 3143.

The first sensor unit 3320 and the second sensor unit 3370 may be defined as a sensor unit. The first indicator 3330 and the second indicator 3380 may be defined as an indicator. The first light emitter 3321 and the second light emitter 3371 may be defined as a light emitter. The first light receiver 3323 and the second light receiver 3373 may be defined as a light receiver.

Although not shown, the first UI module 3301 and the second UI module 3303 may be installed in one printed circuit board. That is, the first sensor unit 3320, the second sensor unit 3370, the first indicator 3330, and the second indicator 3380 may be installed in one printed circuit board.

The controller 1315 may control the first UI module 3301 and the second UI module 3303. The controller 1315 may sense a user input on the basis of the signals of the first sensor unit 3320 and the second sensor unit 3370 and may enable the first indicator 3330 and the second indicator to emit light on the basis of the sensed user input.

When the user's finger is located at a first position as shown in FIG. 16, the controller 1315 may sense that the user's finger is located at the first position according to the output from the first sensor unit 3320. That is, when the user's finger is located at the first position, light output from the first light emitter 3321 is reflected by the user's finger, and the first light receiver 3323 receives the reflected light. Thus, the controller 1315 may prevent the user's finger from being located at the first position.

When the user's finger is located at a second position as shown in FIG. 17, the controller 1315 may sense that the user's finger is located at the second position according to the output from the second sensor unit 3370. That is, when the user's finger is located at the second position, light output from the second light emitter 3371 is reflected by the user's finger, and the second light receiver 3373 receives the reflected light. Thus, the controller 1315 may prevent the user's finger from being located at the second position.

When it is sensed that the user's finger is located at the second position after it is sensed that the user's finger is located at the first position, the controller 1315 may instruct to execute a first function. When it is sensed that the user's finger is located at the second position within a predefined time after it is sensed that the user's finger is located at the first position, the controller 1315 may instruct to execute a second function. That is, when a value greater than or equal to the operation-based sensing value is sensed by the second light receiver 3373 within a predefined time after a value greater than or equal to the operation-based sensing value is sensed by the first light receiver 3323, the controller 1315 may instruct to execute the first function.

On the other hand, when it is sensed that the user's finger is located at the first position after it is sensed that the user's finger is located at the second position, the controller 1315 may instruct to execute the second function. When it is sensed that the user's finger is located at the first position within a predefined time after it is sensed that the user's finger is located at the second position, the controller 1315 may instruct to execute the second function. That is, when a value greater than or equal to the operation-based sensing value is sensed by the first light receiver 3323 within a predefined time after a value greater than or equal to the operation-based sensing value is sensed by the second light receiver 3373, the controller 1315 may instruct to execute the second function.

In this case, a valid period which is a predefined period during which the operation-based sensing value has to be maintained so that the value is determined as a valid input may be shorter than that shown in FIG. 9. This is because probability of being recognized as a false input may be low even when the valid period is short since the user input according to third embodiment should be consecutively performed on the first position and also because a time during which the user's finger stays in the first position or the second position may be short when an input is made by the movement of the user's finger.

The first function and the second function may be different from each other. The controller 1315 instructs to execute different commands depending on the movement of the user's finger, and thus the rearview mirror device may process a user input similar to a gesture input. That is, the rearview mirror device may process an input such as a swipe input.

Figure 18:
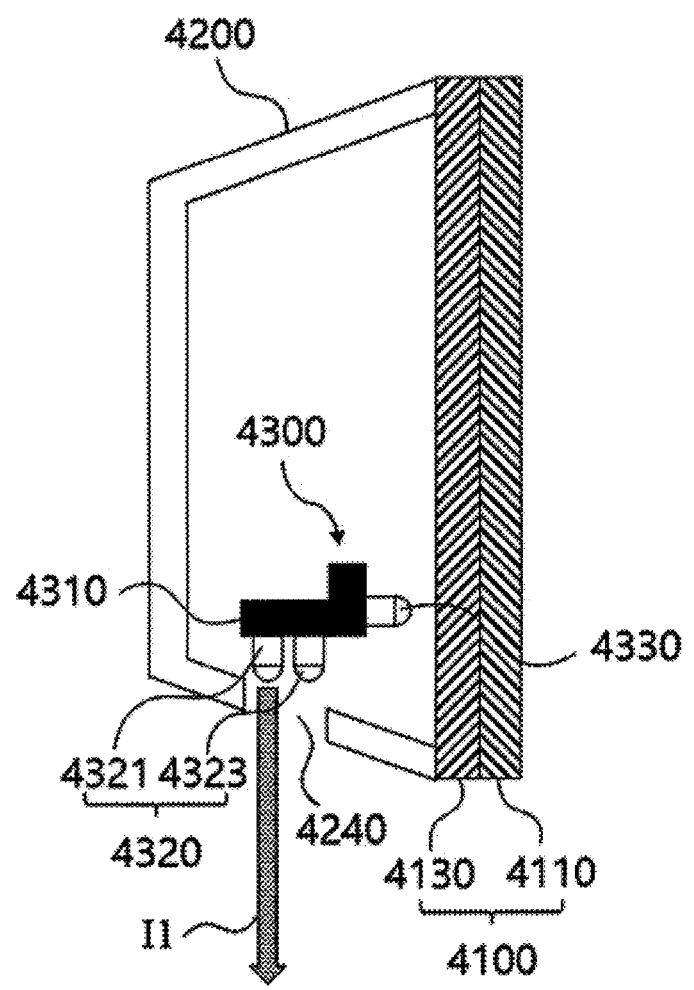
FIGS. 18 and 19 are diagrams showing a sensing process for a rearview mirror device according to a fourth embodiment.
Figure 19:
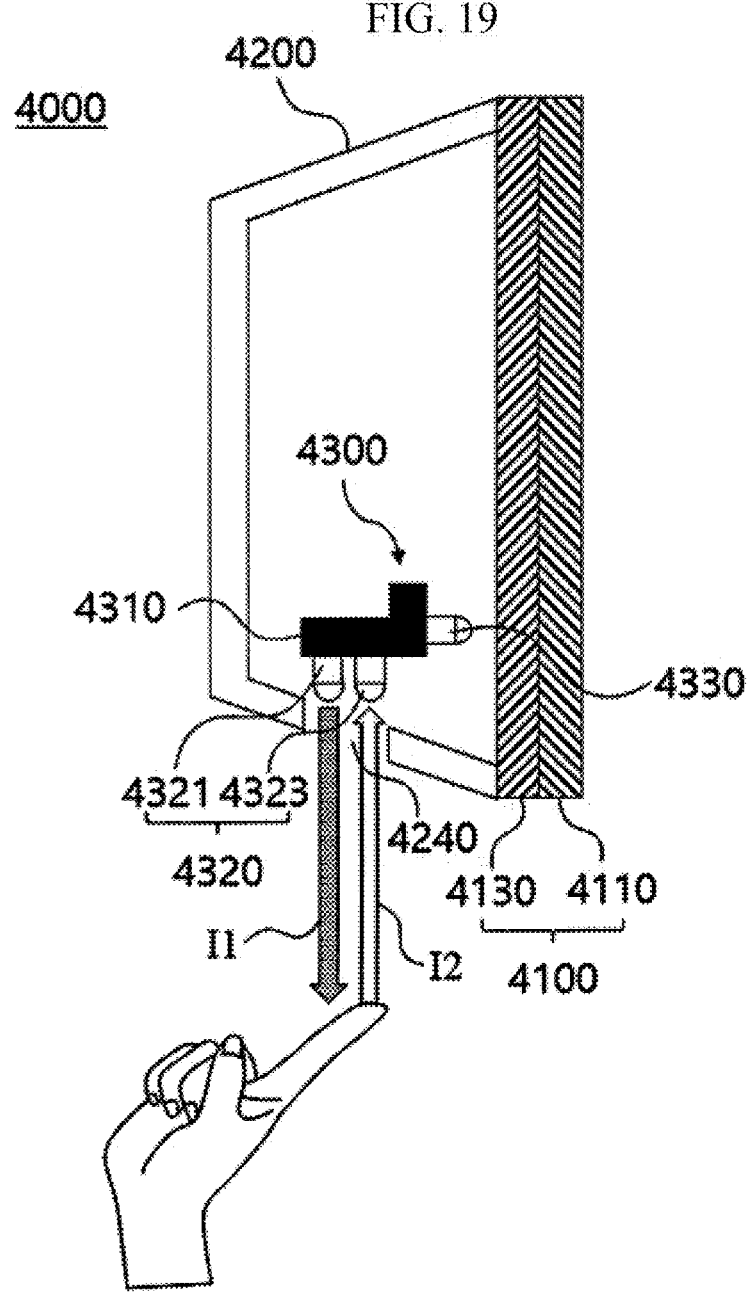

FIGS. 18 and 19 are diagrams showing a sensing process for a rearview mirror device according to a fourth embodiment.

The rearview mirror device according to the fourth embodiment is the same as that of the first embodiment, except that the sensing unit is located in a direction other than the front of the rearview mirror. Accordingly, in the following description of the rearview mirror device according to the fourth embodiment, a detailed description of elements common to the first embodiment will be omitted.

Referring to FIGS. 18 and 19, a rearview mirror device 4000 according to the fourth embodiment may include a rearview element 4100, a housing 4200, and a UI module 4300.

The UI module 4300 may be located between the rearview element 4100 and the housing 4200. The UI module 4300 may be located in an inner space of the rearview mirror device 4000 defined by the housing 4200.

The rearview element 4100 may include a substrate 4110 and a reflector 4130.

The UI module 4300 may include a printed circuit board 4310, a sensor unit 4320, and an indicator 4330.

The sensor unit 4320 and the indicator 4330 may be installed in the printed circuit board 4310.

The sensor unit 4320 may be installed such that the sensor unit 4320 is not oriented toward the rearview element 4100. The sensor unit 4320 may be installed toward the housing 4200. The sensor unit 4320 may be installed toward the side of the housing 4200.

A light transmitting region 4240 may be installed in the housing 4200. The light transmitting region 4240 may be a path of light entering or exiting the sensor unit 4320. The light transmitting region 4240 may be formed to penetrate the housing 4200.

The sensor unit 4320 may include a light emitter 4321 and a light receiver 4323. The light emitter 4321 and the light receiver 4323 may be installed in the printed circuit board 4310. The indicator 4330 may be installed toward the rearview element 4100.

The printed circuit board 4310 may have a different shape depending on the positions of the sensor unit 4320 and the indicator 4330. As shown, the printed circuit board 4310 may be formed in the shape of the letter "L." The printed circuit board 4310 may be formed in a bent shape.

Although not shown, the indicator 4330 may be installed in the housing 4200. In this case, the printed circuit board 4310 may be configured in a planar shape. Also, the indicator 4330 may be installed in the printed circuit board 4310 while being oriented toward the housing 4200. In this case, light output from the indicator 4330 may be output to the outside through the light transmitting region 4240.

An optical axis of light output from the light emitter 4321 may not meet the rearview element 4100. Also, light input to the light receiver 4323 may not be affected by light input from the outside through the rearview element 4100.

As shown in FIG. 18, the light emitter 4321 may output first light to the outside through the light transmitting region 4240.

As shown in FIG. 19, when the user's finger is located in a region adjacent to the light transmitting region 4240, light reflected by the user's finger may be input to the light receiver 4323 through the light transmitting region 4240 in the form of second light.

The controller 1315 may sense the user's input through the amount of light input to the light receiver 4323.

For the rearview mirror device 4000 according to the fourth embodiment, a light transmitting region is installed not in the rearview element 4100 but in the housing 4200. It is possible to simplify the manufacturing process. Also, when the rearview mirror device 4000 is produced in the form of a display mirror, it is not necessary to form a light transmitting region on a display, so that it is possible to provide a non-distorted image to a user. Also, the entering or exiting light does not pass through the rearview element 4100, so that it is possible to prevent a sensing value from changing depending on ambient environments, thus reducing a false input.

Figure 20:
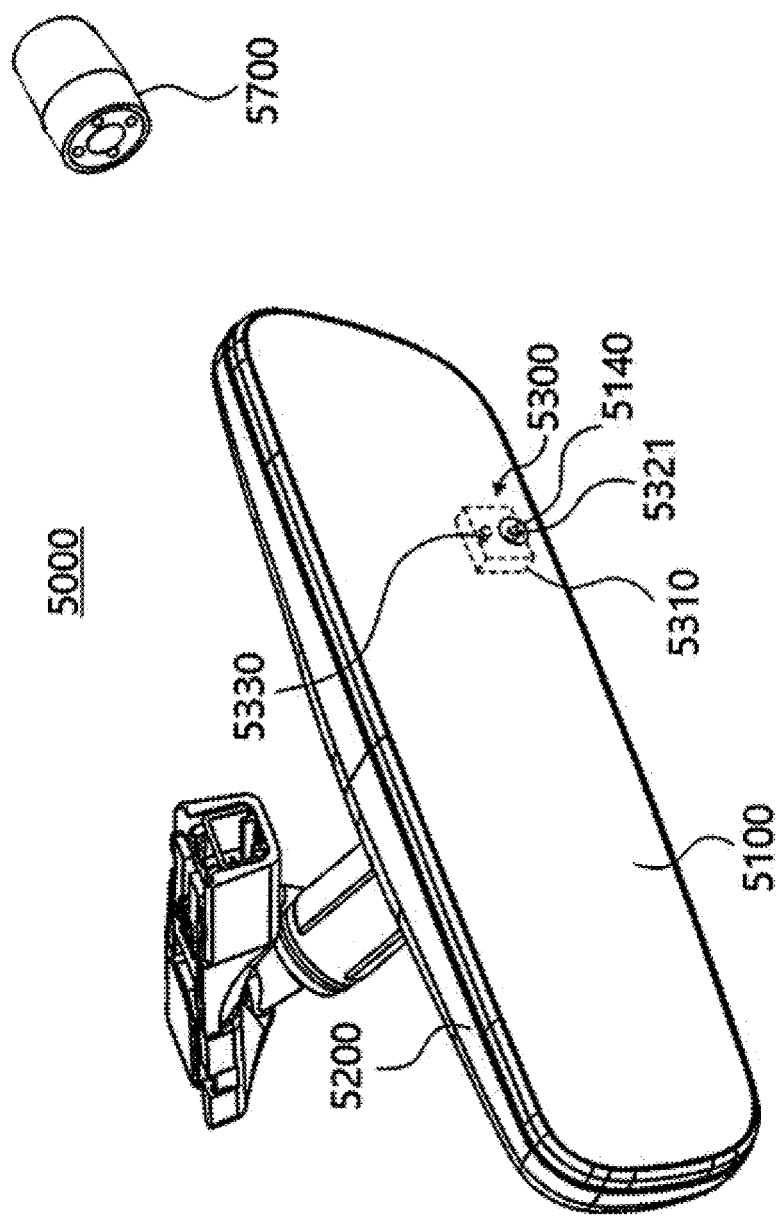
FIGS. 20 and 21 are diagrams showing a sensing process for a rearview mirror device according to a fifth embodiment.
Figure 21:
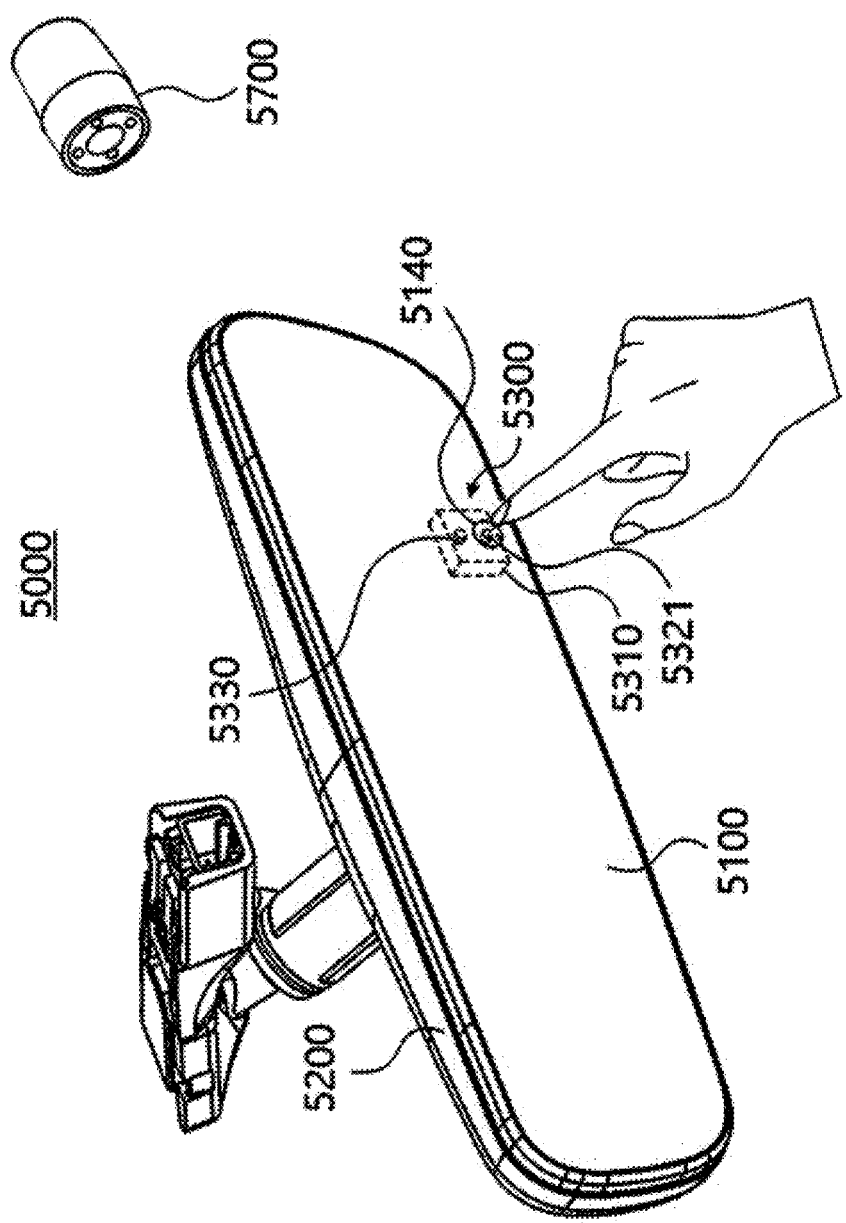

FIGS. 20 and 21 are diagrams showing a sensing process for a rearview mirror device according to a fifth embodiment.

The rearview mirror device according to the fifth embodiment is the same as that of the first embodiment, except that the camera is located outside the rearview mirror device. Accordingly, in the following description of the fifth embodiment, a detailed description of elements common to the first embodiment will be omitted.

Referring to FIGS. 20 and 21, a rearview mirror device 5000 according to the fifth embodiment may include a rearview element 5100, a housing 5200, a UI module 5300, and a camera 5700.

A light transmitting region 5140 may be formed in the rearview element 5100.

The UI module 5300 may include a light emitter 5321 and an indicator 5330.

The light emitter 5321 may be installed at a position corresponding to the light transmitting region 5140. Although not shown, when the light emitter 5321 penetrates the rearview element 5100, the light transmitting region 5140 may be omitted. In this case, the light emitter 5321 may be designed as a device that outputs a high frequency to pass through the rearview element 5100.

The camera 5700 may be installed outside the rearview mirror device 5000. The camera 5700 may be installed at a position where the rearview mirror device 4000 can be viewed. The camera 5700 may be installed in a ceiling region above the driver's seat. The camera 5700 may be installed in the headliner of the vehicle.

The camera 5700 may image the light emitter 5321. The camera 5700 may detect light output by the light emitter 5321. When the light emitter 5321 outputs infrared light, the camera 5700 may be an infrared camera.

When the user's finger is not adjacent to the rearview mirror device 5000 as shown in FIG. 21, the light output by the light emitter 5321 may be detected by the camera 5700.

When the user's finger is adjacent to the rearview mirror device 5000 as shown in FIG. 21, the light output by the light emitter 5321 may not be detected by the camera 5700. When the user's finger is located in a region adjacent to the light transmitting region 5140, the light originating from the light emitter 5321 may be blocked by the user's finger, and thus the camera 5700 cannot detect the light output by the light emitter 5321. When the user's finger is located between the light emitter 5321 and the camera 5700, the light originating from the light emitter 5321 may be blocked by the user's finger, and thus the camera 5700 cannot detect the light output by the light emitter 5321.

The controller 1315 may sense the user's input on the basis of a signal received from the camera 5700.

Although not shown, the camera 5700 may detect light originating from the indicator 5330. When the user's finger is located in a region adjacent to the indicator 5330 while light is always output from the indicator 5330, the camera 5700 cannot detect the light output from the indicator 5330. Thus, it is possible to sense the user's input. In this case, the light emitter 5321 may be omitted.

Also, when the user's input is sensed, the controller 1315 may inform the user that the input is made by controlling the indicator 5330 to output light having another wavelength. Alternatively, the controller 1315 may inform the user that the input is made by changing the shape of light output by the indicator 5330.

The rearview mirror device according to an embodiment can sense a user input using an input to a mirror surface and thus implement a user interface of a frameless-type rearview mirror device.

The rearview mirror device according to an embodiment can prevent a mirror surface from being contaminated by fingerprints by providing a user input without direct contact with a mirror surface, thus providing a distortion-free visual field to a user.

While the elements and features of the present disclosure have been described with reference to embodiments of the present disclosure, the present disclosure is not limited thereto. It will be obvious to those skilled in the art that various changes or modifications may be made therein without departing from the spirit and scope of the present disclosure. Accordingly, such changes or modifications are intended to fall within the scope of the appended claims.

REFERENCE LIST

11 first light
12 second light
pd predefined time
pth valid period
pth1 first valid period
pth2 second valid period
pth3 third valid period
t1 first time point
t2 second time point
t3 third time point
t4 fourth time point
ta time point
tb time point
w1 first wavelength
w2 second wavelength
1000 rearview mirror device
1100 rearview element
1110 substrate
1120 housing
1130 reflector
1140 light transmitting region
1200 housing
1300 user interface (UI) module
1310 printed circuit board
1315 controller
1320 sensor unit
1321 light emitter
1323 light receiver
1330 indicator
1400 adhesive unit
1440 adhesive-layer-specific light transmitting region
1500 housing cover
1540 housing-cover-specific light transmitting region
2300 UI module
2315 controller
2320 sensor unit
2321 light emitter
2323 light receiver
2330 indicator
2340 illuminance sensor unit
2341 ambient light sensor
2343 glare sensor
3100 rearview element
3140 light transmitting region
3141 first light transmitting region
3143 second light transmitting region
3200 a housing
3300 UI module
3301 first UI module
3303 second UI module
3310 first printed circuit board
3320 first sensor unit
3321 first light emitter
3323 first light receiver
3330 first indicator
3350 second printed circuit board
3370 second sensor unit
3371 second light emitter
3373 second light receiver
3380 second indicator
4000 rearview mirror device
4100 a rearview element
4110 substrate
4130 reflector
4200 housing
4240 light transmitting region
4300 UI module
4310 printed circuit board
4320 sensor unit
4321 light emitter
4323 light receiver
4330 indicator
5000 rearview mirror device
5100 rearview element
5140 light transmitting region
5200 housing
5300 UI module
5321 light emitter
5330 indicator
5700 camera

The invention claimed is:
1. A rearview device for a motor vehicle, comprising:
a rearview element including a first layer and a second layer;
a housing supporting at least a portion of the rearview element;
a light transmitting region formed to penetrate the second layer of the rearview element;

a light emitter for emitting a first light including a first wavelength in a first direction through the light transmitting region; and a light receiver for detecting a second light entering a second direction through the light transmitting region, the second light entering the second direction including a second wavelength corresponding to the first wavelength, wherein a first function of the rearview device or an electrically operating configuration connected with the rearview device is executed when the second light including the second wavelength corresponding to the first wavelength is detected by the light receiver by a predetermined amount or more during a predetermined period, and wherein a transmittance of the first layer is larger than a transmittance of the second layer, or wherein a function of the rearview device or an electrically operating configuration connected with the rearview device is executed when an object is located within a certain distance from light transmitting region, and wherein a transmittance of the first layer is larger than a transmittance of the second layer.

2. The rearview device of claim 1, wherein the light emitter and the light receiver are comprised of one component in form of a sensor unit and are a photocoupler.

3. The rearview device of claim 1, wherein the first wavelength is equal to the second wavelength.

4. The rearview device of claim 1, wherein a time at which the second light including the second wavelength is detected by the light receiver by a predetermined amount or more during the predetermined period is defined as a first time), a time at which the first function is executed is defined as a second time, and the first time and the second time are different from each other.

5. The rearview device of claim 4, wherein a second function is executed when the second light including the second wavelength is detected by the light receiver by the predetermined amount or more again after the first time, a third function is executed when the second light including the second wavelength is detected by the light receiver by the predetermined amount or more during a first period, and a fourth function is executed when the second light including the second wavelength is detected by the light receiver by the predetermined amount or more during a second period.

6. The rearview device of claim 1, wherein the light emitter includes a first light emitter and a second light emitter, the light receiver includes a first light receiver and a second light receiver, and the light transmitting region includes a first light transmitting region and a second light transmitting region, wherein the first light emitter and the first light receiver are comprised of a first photocoupler, the second light emitter and the second light receiver are comprised of a second photocoupler, and wherein the first photocoupler is located at an area corresponding to the first light transmitting region, the second photocoupler is located at an area corresponding to the second light transmitting region.

7. The rearview device of claim 6, wherein a fifth function is executed when the second light including the second wavelength is detected by the second light receiver by the predetermined amount or more after the second light including the second wavelength is detected by the first light receiver by the predetermined amount or more, wherein a sixth function is executed when the second light including the second wavelength is detected by the first light receiver by the predetermined amount or more after the second light including the second wavelength is detected by the second light receiver by the predetermined amount or more, with the fifth function in particular being different from the sixth function.

8. The rearview device of claim 1, further comprising:

a controller, and an indicator indicating to a user that the first function is executed, wherein the indicator is located adjacent to the light transmitting region, a state of the indicator is changed when the first function is executed, and the controller controls the sensor unit and/or the indicator.

9. The rearview device of claim 1, wherein an electrically operating configuration connected with the rearview device is at least one of an electrochromic element, a display, a speaker, a communication module and an Electronic Toll Collection System, wherein the first function of the electrochromic element is at least one of turn on/off and changing reflectivity, or the first function of the display is at least one of turn on/off, zoom in/out, dimming brightness up/down, pan/tilt, contrast up/down and aspheric view on/off.

10. The rearview device of claim 1, wherein the second layer is a reflective layer, and the first layer is a substrate.

11. The rearview device of claim 1, wherein the function is executed without contact between the rearview element and the object.

12. A vehicle with at least one rearview device of claim 1.

* * * * *